United States Patent [19]
Lorbiecki

[11] Patent Number: 6,120,630
[45] Date of Patent: *Sep. 19, 2000

[54] METHOD OF MAKING A SEAT CUSHION

[75] Inventor: James R. Lorbiecki, Milwaukee, Wis.

[73] Assignee: Milsco Manufacturing Company, Milwaukee, Wis.

[*] Notice: This patent is subject to a terminal disclaimer.

[21] Appl. No.: 09/056,319

[22] Filed: Apr. 7, 1998

Related U.S. Application Data

[63] Continuation of application No. 08/556,303, Nov. 13, 1995, Pat. No. 5,743,979.

[51] Int. Cl.$^7$ .............................. B32B 31/04; B32B 31/20
[52] U.S. Cl. ..................... 156/79; 156/196; 156/212; 156/214; 156/222; 156/229; 156/285
[58] Field of Search ..................................... 29/91.1, 91.5, 29/91.7; 156/285, 229, 494, 224, 222, 214, 212, 79, 196, 245

[56] References Cited

U.S. PATENT DOCUMENTS

| | | |
|---|---|---|
| 2,978,376 | 4/1961 | Hulse . |
| 3,258,511 | 6/1966 | McGregor, Jr. . |
| 3,616,013 | 10/1971 | Bocchi . |
| 3,712,673 | 1/1973 | Swenson . |
| 3,932,252 | 1/1976 | Woods . |
| 4,046,611 | 9/1977 | Sanson . |
| 4,089,919 | 5/1978 | Sanson . |
| 4,114,213 | 9/1978 | Beernaerts et al. . |
| 4,137,030 | 1/1979 | Sanson . |
| 4,156,544 | 5/1979 | Swenson et al. . |
| 4,190,697 | 2/1980 | Ahrens . |
| 4,247,348 | 1/1981 | Lischer . |
| 4,405,681 | 9/1983 | McEvoy . |
| 4,420,447 | 12/1983 | Nakashima . |
| 4,647,109 | 3/1987 | Christopherson et al. . |
| 4,726,086 | 2/1988 | McEvoy . |
| 4,740,417 | 4/1988 | Tornero . |
| 4,744,848 | 5/1988 | Andrews et al. . |
| 4,755,411 | 7/1988 | Wing et al. . |
| 4,758,294 | 7/1988 | Storch . |
| 4,806,094 | 2/1989 | Rhodes, Jr. et al. . |
| 4,818,331 | 4/1989 | Shimada . |
| 5,498,381 | 3/1996 | Lorbiecki et al. . |
| 5,538,326 | 7/1996 | Lorbiecki . |
| 5,658,050 | 8/1997 | Lorbiecki . |
| 5,743,979 | 4/1998 | Lorbiecki . |

FOREIGN PATENT DOCUMENTS

| | | |
|---|---|---|
| 0 333 236 | 10/1984 | European Pat. Off. . |
| 0 773 095 A3 | 12/1996 | European Pat. Off. . |

OTHER PUBLICATIONS

European Search Report Application No. EP 96 46 0037 dated Jan. 11, 1999.

*Primary Examiner*—Sam Chuan Yao
*Attorney, Agent, or Firm*—Boyle Fredrickson Ziolkowski S.C.

[57] ABSTRACT

A method of forming fabric for making foam-in-place molded articles such as preferably seat cushions. A film is secured to a frame and tacked by adhesive to a piece of fabric, not secured to the frame, that forms the outer covering of the seat cushion for permitting the fabric to move relative to the film during forming to enable fabrics which cannot stretch a considerable amount to be used. To form the fabric, the film and fabric are placed in a female mold and the film and fabric are drawn into a cavity of the mold and against a contoured surface in the cavity forming a recess in the film and fabric. To counteract compressive stresses in the fabric during forming, the frame can have one or more fabric tensioners that selectively apply tension to the fabric during forming. To mold the cushion, a foam is poured into the recess and allowed to cure until it hardens into a foam core and bonds with the film. Preferably, to fix the shape of the film and fabric to that of the contoured surface of the mold cavity to enable the foam to be poured into the recess without requiring the film and fabric to be supported by the mold, the adhesive, film and fabric are heated before forming to make them pliable and cooled after forming to fix their shape to substantially conform to that of the contoured surface of the mold cavity.

42 Claims, 8 Drawing Sheets

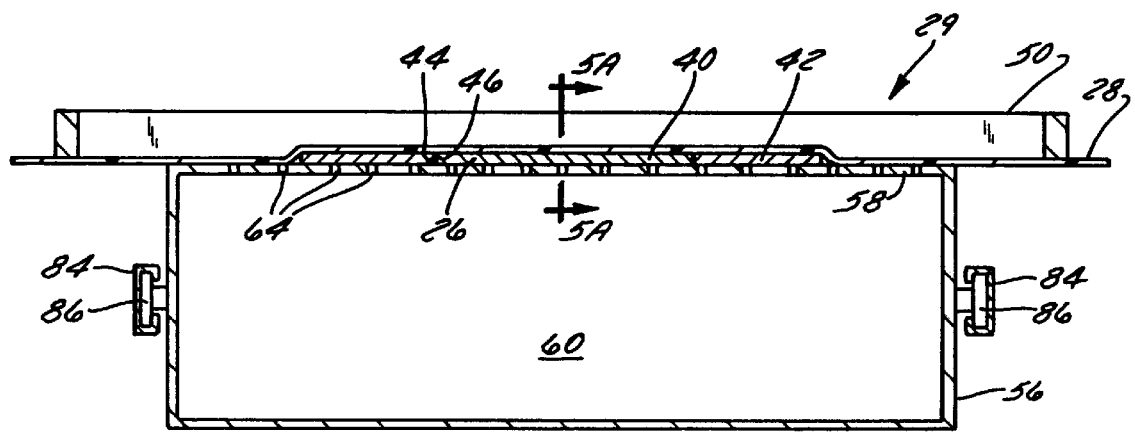
FIG. 5
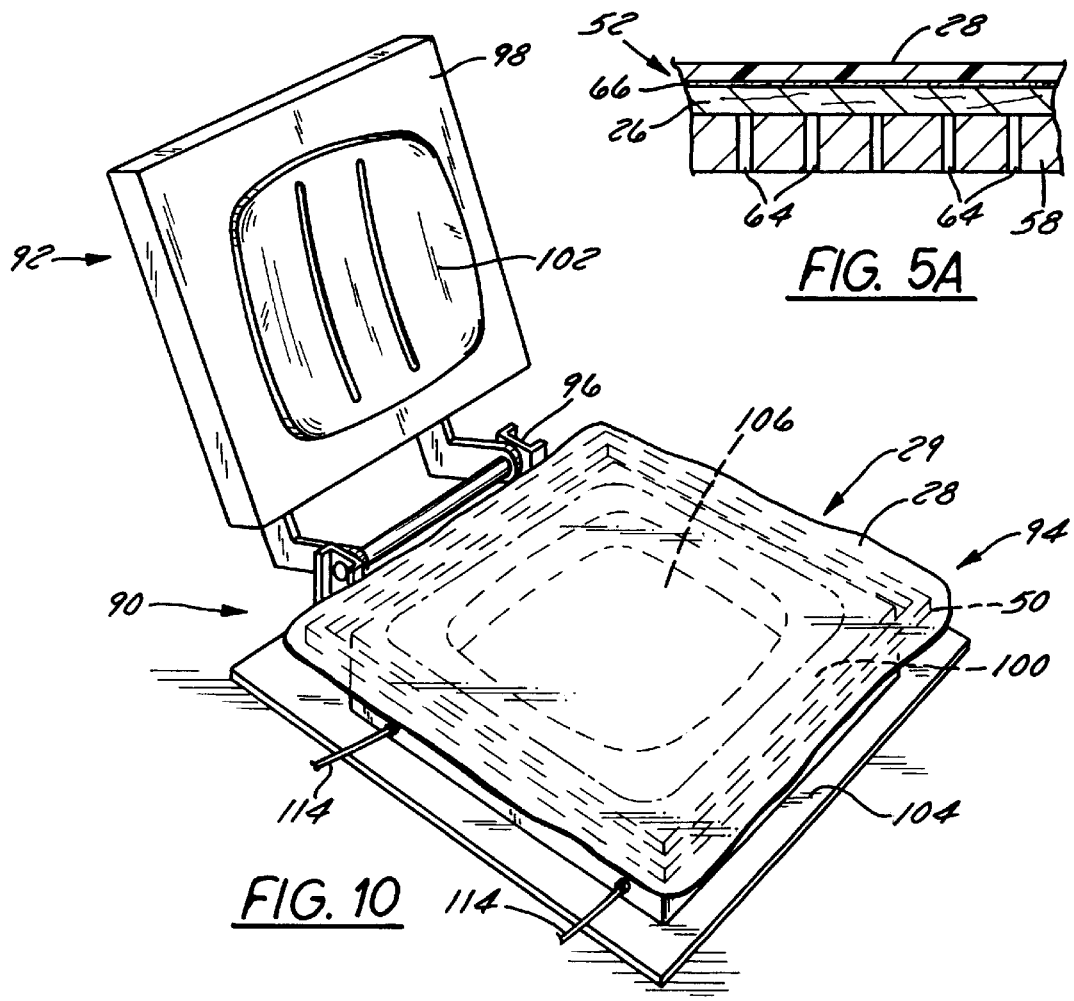
FIG. 5A
FIG. 10

METHOD OF MAKING A SEAT CUSHION

This application is a continuation of presently U.S. Ser. No. 08/556,303 filed Nov. 13, 1995 now U.S. Pat. No. 5,743,979.

FIELD OF THE INVENTION

This invention relates generally to a method and apparatus for forming fabric and more particularly to a simplified method and apparatus for forming articles such as seat cushions and the like.

BACKGROUND OF THE INVENTION

In the manufacture of cushions and other similar articles, such as cushions for vehicle seats, chairs and the like, many widely varying methods have been developed for making such articles. Two commonly known methods of making seat cushions are referred to in the industry as cut-and-sew, where a fabric seat cover is fitted onto a preformed foam core, and "foam-in-place," where the seat cover fabric is drawn by a vacuum into a mold three dimensionally forming the fabric and foam is poured into the mold over the formed fabric.

In cut-and-sew seat cushion manufacturing, the seat cover material is first cut to a certain size and shape to enable it, after being sewn, to either (1) fit over a preformed foam core or (2) be stuffed with foam or another filler material. However, cutting the seat cover material to size and sewing it so it will snugly fit over a preformed foam core requires a great many manufacturing operations to be performed which can result in higher than desired manufacturing costs and a lower than desired rate of seat cushion production. Moreover, in most instances, much of the sewing that is performed in constructing these seat covers cannot be done with the fabric flattened, adding to the difficulty of making cut-and-sew seat covers. Finally, many of these operations must be done manually further increasing production costs.

In many instances, an adhesive is applied over the preformed foam core before the seat cover is fitted onto the blank in an attempt to prevent the cut-and-sew cover from undesirably sliding on the foam core. Unfortunately, unless the application of adhesive is relatively uniform and the bond between the fabric and foam strong and long lasting, there can still be some slippage between the cover and foam causing the foam blank and cover to undesirably wear.

To further minimize slippage and improve the durability of the seat cushion, low stretch, woven fabrics have been used to construct cut-and-sew seat covers. Although, these types of fabrics provide superior durability over other types of seat cover materials, such as higher stretch, knit fabrics, they can be difficult to cut and sew to obtain the appropriate shape to consistently and uniformly fit over preformed foam cushion cores in a high volume, assembly line setting. If fit is poor, wrinkles can form on the cover resulting in a poorly looking seat cushion. Also, if even small wrinkles form, there can be slippage between the cover and foam causing undesirable wear. Although applying an adhesive onto the foam can help better anchor the cover to the foam while preventing wrinkles, it is a costly additional manufacturing step that can also undesirably slow seat cushion production.

As a lower cost method of making seat cushions, foam-in-place seat cushion manufacturing was initially used with vinyl as the outer seat cover material. In this seat cushion manufacturing process, a generally flat piece of vinyl seat covering material is placed in a frame. The frame is placed in an oven where it is heated to soften it sufficiently for being shaped into a cushion cover. To form the vinyl covering, the heated vinyl is placed in a vacuum mold where it is drawn against the inner surface of the mold, conforming the vinyl to its contour. Upon forming, a foam is poured into the mold over the vinyl. When sufficiently cooled and after the foam cures and hardens, a fully formed seat cushion is removed from the mold and vinyl along the bottom edge of the cushion is trimmed.

Unfortunately, vinyl is not very breathable causing perspiration on a person sitting on a vinyl cushion to become trapped between the vinyl and the body of that person. As a result, sitting on seats that have vinyl covers for long periods of time can be uncomfortable. Moreover, vinyl is less durable as it can become brittle and crack over time as plasticizers in the vinyl evaporate or migrate from the vinyl. Therefore, as a result of at least these characteristics, vinyl has been, for quite some time, a less than an ideal choice for seat manufacturers.

In an effort to improve upon at least some of the drawbacks of vinyl, a method of foam-in-place seat cushion manufacturing has been developed that utilizes a fabric seat cover that is highly stretchable. To construct a seat cushion using high stretch cloth fabric as a seat covering material, a laminate of fabric, foam and film is secured in a frame. After preheating, the frame is placed over a vacuum mold where the fabric and film are drawn against the mold by suction with the film acting as a seal for preventing leakage during molding. Thereafter, a foam is poured into the mold over the film and fabric to form the cushion. When the foam has solidified, the cushion is removed from the mold and the fabric and film are trimmed from around the bottom of the cushion.

During vacuum molding, since the fabric is fixtured to the frame, as it is drawn into the cavity of the mold it stretches a great deal. Since the fabric, foam and film are already bonded to form a laminate before forming occurs, there can be only very limited relative movement between the fabric and film during forming to facilitate forming. Should excessive relative movement occur during forming, the foam layer could undesirably tear or rupture also producing wrinkles or another unwanted defect.

During forming, the high stretch fabric is typically never stretched so far as to cause compression of any portion of the fabric, thereby preventing wrinkling. Therefore, this seat cushion manufacturing process requires a seat covering material that can stretch a considerable amount without rupturing, such as would occur if more durable, low stretch fabrics typically used for cut-and-sew seat covers were utilized.

High stretch fabrics suitable for this vehicle seat cushion manufacturing process include knit fabrics, such as circular knit fabrics, and other fabrics possessing high stretch content. Unfortunately, while these high stretch fabrics are used because they are easy to successfully form, they possess relatively poor durability as compared to the relatively low stretch fabrics used in cut-and-sew seat cushions. For example, some of these high stretch fabrics are known to fail during scrub testing after as few as 20,000 scrub cycles whereas lower stretch fabrics are known to be more durable. As a result, seat cushions constructed using high stretch fabrics tend to be less favored by purchasers of seat cushions, such as seating and vehicle manufacturers, as well as owners of products having such seat cushions.

Additionally, even high stretch seat cover fabrics can wrinkle during vacuum molding because they are clamped about their periphery to the frame causing some parts of the clamped fabric to be pulled more than other parts when the vacuum draws the fabric against the mold. This is at least in part because of the heretofore unrecognized effects of compression on a fabric seat cushion blank. These wrinkles can adversely affect the seal between the film and mold which can lessen the vacuum in the mold cavity causing the fabric to be less tightly drawn against the inner contoured surface of the mold cavity than desired. These wrinkles can adversely affect vacuum integrity by functioning as air passages allowing outside air to enter the mold, which even further reduces the integrity of the vacuum also causing the seat cover fabric to be drawn less tightly against the contoured inner mold cavity surface than desired. As a result, after the foam is poured and solidified, these wrinkles and indentions in the fabric where the seat cover was not firmly against the mold can be permanent resulting in a seat cushion of poor appearance and which may not pass quality control. Of course, if a seat cushion having these defects fails quality control inspection, it may have to be repaired at considerable additional expense or, even worse, scrapped.

Another disadvantage of this seat cushion manufacturing process is that a piece of fabric much larger than the seat cushion is required so that it can be clamped in a frame that is also larger than the cushion that is being constructed. This extra fabric, that is the fabric in excess of what is necessary to cover the seat cushion, must be trimmed after the poured foam has solidified resulting in a costly extra manufacturing step, as well as wasting seat cover fabric material.

A somewhat similar foam-in-place seat cushion manufacturing process is disclosed in Sanson, U.S. Pat. No. 4,046,611. In Sanson, a cloth seat covering fabric coated with an elastic plastic coating is fixtured in a frame so that a die can press against the cloth to prestretch before it is vacuum molded. To further form the cloth, the cloth is removed from the frame and placed over a vacuum mold where the cloth is tightly clamped between a gasket and an outer surface of the mold before vacuum is applied to draw the prestretched seat cover cloth against the mold. After forming is complete, foam is poured into the mold over the seat cover cloth and a lid is placed over the gasket and mold to assist in curing and solidifying the foam.

In addition to the aforementioned foam-in-place seat cushion making drawbacks, this process requires more manufacturing steps making it more costly. Moreover, this method is also limited to fabrics that can be greatly stretched because the seat cover fabric is clamped to the mold during the steps of prestretching and vacuum forming requiring it to stretch a great deal before it contacts the mold. Additionally, this method is also limited to high stretch fabrics because of the elastic plastic coating applied to the fabric.

Another somewhat less similar foam-in-place seat cushion manufacturing method is disclosed in Lischer, U.S. Pat. No. 4,247,348. The method disclosed in Lischer requires a rather complex and more expensive multi-layer seat cover cloth of special construction having its outer layer constructed of a fabric that cannot have been heat set before vacuum forming. The use of fabric that has not been heat set is required by this method to maximize the elasticity of the fabric outer layer during forming so that it will be able to stretch sufficiently to conform to intricate mold patterns.

In Lischer, the preferred seat cover cloth blank is a laminate that has an outer layer of fabric sandwiching a layer of foam between the fabric and a film layer. The foam layer is provided to permit some minute or very limited movement of the fabric relative to the film for preventing rupture of the film during forming. To construct the cloth, a rather complicated and relatively costly process is required to bond the layers together.

In the molding process disclosed in Lischer, the cloth is first cut to size and then heated to a temperature greater than the temperature at which the cloth will heat set and the film loses its shape memory. After preheating, the cloth is placed in a heated female vacuum mold where a vacuum is applied to draw the cloth against the inner surface of the mold. To set the cloth, the mold is also maintained for a period of time at a sufficiently high temperature to enable the cloth to become heat set after it is sufficiently cooled. Thereafter, the mold and cloth are allowed to cool approximately 30° to 50° Fahrenheit so that the fabric does become set. After the mold has cooled and the cloth become heat set foam, in its liquid state, is poured into the female mold over the cloth. Unless the mold is cooled or the cloth transferred to a cooler mold, the cooling of the cloth and mold can be time consuming reducing production volume.

To cure the foam, the temperature of the mold must be lowered to approximately 100° Fahrenheit or else the foam and cloth must be thereafter disadvantageously transferred to a cooler female mold. During expansion of the foam, a male mold is placed over the top of the foam and female mold. Unfortunately, this method requires special cloth of more complex laminated manufacture which can increase the cost of making seat cushions using this method. Additionally, this method of manufacture is also more complicated and significantly more time consuming making it more costly and less desirable to practice in a high volume, manufacturing setting. Moreover, if too great of relative movement occurs between the film and fabric during forming, the foam can rupture producing a finished product that is not firmly adhered to its base. If not fly adhered to its base, wear by rubbing can occur reducing the durability of the fabric while also possibly adversely affecting its appearance.

Finally, a heretofore unrecognized problem in forming fabrics, and particularly low stretch fabrics, is the role that stress plays during forming. A recognized difficulty in forming low stretch fabrics is that they previously could not be deeply drawn into molds because they could not stretch a great deal during forming or else they would wrinkle. Previously believed to be unrecognized is the role that tensile and compressive stresses played in the formation of these wrinkles in low stretch fabrics. It was previously not believed to be recognized that certain areas of a fabric blank are subjected to compressive stresses during forming which leads to buckling of the fabric in those high compressive stress regions which, in turn, causes wrinkling of the fabric, all of which is highly undesirable. As previously discussed, wrinkling is undesirable because it results in a poorly looking cushion and one which can have poor wear characteristics.

SUMMARY OF THE INVENTION

A method and apparatus for forming fabric to construct a molded article such as preferably a seat cushion for a vehicle. In the making of the molded article, an airtight, stretchable film is secured to a frame, a piece of fabric is placed on the film without being secured to the frame and an adhesive is between the fabric and film creating a seat cover blank that can be formed and molded. To form the blank, the adhesive is preheated until it becomes tacky to tack the fabric to the film while allowing the fabric to move relative to the film. After preheating, and while the hot adhesive is still in its tacky state, the fabric and film are formed in a female vacuum mold. During forming, the fabric and film move relative to each other allowing the film to stretch to fit the contour of the mold while minimizing the amount that the fabric must stretch to conform to the contour of the mold. Stretching of the fabric is also minimized during forming because the fabric is not secured in any way to the frame. During molding, a foam is poured over the formed film and fabric and the foam is cured until it hardens to form a foam core for the molded article. Thereafter, excess film is trimmed and if necessary excess fabric is trimmed.

Preferably during preheating, the film is also heated to a temperature that resets its shape memory and is held above that temperature during forming so that its shape memory is set substantially to conform the shape of the film to the contour of the mold when the film has sufficiently cooled. Preferably, the adhesive is a thermally activated adhesive having an activation and cure temperature. During preheating, the temperature of the adhesive is raised above its activation temperature enabling it to tack the fabric to the film while enabling relative movement therebetween. To cause the fabric and film to intimately bond after the adhesive has suitably cooled after forming is completed, the film is preferably drawn tightly against the fabric during preheating using a vacuum, such as from a vacuum table, and the adhesive is allowed to cool below its cure temperature.

Preferably, during preheating, the film is heated to a temperature that enables its shape memory to be reset to the shape it takes upon forming and the adhesive is heated to a temperature above its activation temperature. Preferably, the adhesive and film are maintained above the activation and memory reset temperature during forming so (a) that the fabric can move relative to the film during forming to minimize stretching of the fabric, (b) the film can provide support to the fabric during forming to help prevent buckling and wrinkling, and (c) the memory of the film can be set to the shape taken by the fabric and film after forming is completed. After forming, the adhesive and film are preferably cooled sufficiently to finish activation of the adhesive to bond the fabric to the film and to set the memory of the film to the shape taken upon forming both preferably to fix the shape of the fabric to conform to the contour of the mold.

During forming, the frame, film and fabric are placed over the mold and the fabric and film are drawn into a cavity in the mold and against a contoured surface inside the mold cavity creating a recess in the film and fabric where they have been drawn downwardly into the mold cavity. Advantageously, since the size of the fabric approximates the amount of fabric required to form the seat covering, virtually no fabric preferably extends greatly beyond the mold cavity causing the film to seal directly against the mold about the periphery of the mold resulting in a seal of good integrity that is maintained during forming. Additionally, by not securing or clamping the fabric to the frame and maintaining the adhesive at a temperature such that it is tacky, thereby adhering the fabric to the film without being bonded together, the fabric can move relative to the film during forming thereby minimizing how much the fabric must stretch and compress during forming.

To facilitate providing a vacuum seal of good integrity about the periphery of the mold, the film is preferably sandwiched between a sealing surface of the vacuum mold and the frame. To locate the seat cover fabric over the mold cavity while helping to facilitate sealing, particularly where relatively thick or relatively porous seat cover fabrics are being formed, the mold or an overlay carried by the mold can have a recessed sealing channel for receiving and preferably locating the frame.

To prevent compressive stresses which arise in the fabric during forming from causing buckling of the fabric and wrinkling, one or more fabric tensioners are carried by the frame and engage the fabric to selectively tension the fabric. In one preferred embodiment, the fabric tensioner is a spring-biased hook which engages a notch in the fabric to selectively apply tension to the fabric to prevent buckling and wrinkling. One or more or even several fabric tensioners can be used to prevent buckling and wrinkling in different areas of the fabric blank enabling low stretch fabrics to be used for seat covers, even where the low stretch fabric must be deeply drawn during forming.

After forming, a foam, that is preferably thermally activated, is poured into a recess created in the film and fabric where the film and fabric are drawn inwardly during forming to conform to the contour of the mold. Preferably, the foam is poured into the recess while the film and fabric are still received in the mold. Alternatively, however, after the shape of the film and fabric are fixed to conform to the shape of the mold, the film and fabric can be removed from the mold before pouring the foam into the recess.

After molding and after the foam has cured and hardened, the excess fabric and film can be trimmed to form a molded article of solid, unitary construction. By sizing the fabric properly and because the fabric need not be secured or clamped in the frame using the method of this invention, trimming of the fabric is minimized and preferably virtually eliminated.

Objects, features and advantages of this invention are to provide a method and apparatus for making molded articles, such as preferably vehicle seat cushions, which minimizes stretching of the seat cover fabric during forming enabling more durable low stretch fabrics to be used; enables low stretch woven cloth to be used as seat cover material; prevents compressive stresses which form during molding low stretch seat cover fabrics from causing buckling and wrinkling; can be used to construct a wide variety of molded articles including vehicle seat chair cushions, motorcycle seat cushions, chair seat cushions and the like; does not require the seat cover fabric to be specially prepared or laminated before forming and molding; does not severely heat cycle the vacuum mold enabling simpler less expensive molds to be used; minimizes the amount of fabric used to form the seat cover; minimizes the amount of seat cover fabric that must be trimmed after molding minimizing the amount of fabric wasted; enables more elaborate cut-and-sew types seat cover appearance to be achieved without the disadvantages, additional manufacturing steps and expense that accompanies cut-and-sew seat cushion manufacture; enables patterns and other seat cover decorations to be sewn into the seat cover fabric while the fabric is a flat piece of cloth before forming and molding significantly lessening the cost to construct such elaborate seat covers; enables more durable low stretch fabrics, normally used for cut-and-sew seat covers, to be used in a foam-in-place molding process; enables cut-and sew fabrics to be used to form the seat cover without requiring its seams to be sealed; eliminates complex fixturing and labor normally required to produce a seat cushion having a covering of low stretch fabric normally used in cut-and-sew type seat cushions; enables the seat cover fabric to be simply and easily decorated or embroidered as a flat blank before forming and molding; enables special seat cover effects, such as intentionally placed wrinkles, to be achieved by selectively programming the application of the adhesive between the film and seat cover fabric; results in a bond that is uniform and of good integrity between the seat cover and foam core; and is a method that is simple, flexible, economical and reliable, and which produces a seat cushion of good integrity and durability.

BRIEF DESCRIPTION OF THE DRAWINGS

These and other objects, features, and advantages of this invention will become apparent from the following detailed description of the best mode, appended claims, and accompanying drawings in which:

FIG. 5 is a cross sectional view of the seat cover blank and vacuum table taken along line 5—5 of FIG. 4;

FIG. 5A is an enlarged fragmentary cross sectional view of the blank and vacuum table top taken along line 5A—5A of FIG. 5 illustrating a layer of adhesive between the fabric and film of the seat cover blank;

FIG. 10 is a perspective view of the frame and seat cover blank placed over a female vacuum or cushion mold;

DETAILED DESCRIPTION OF THE INVENTION

I. Seat Cushion Construction

Figure 1:
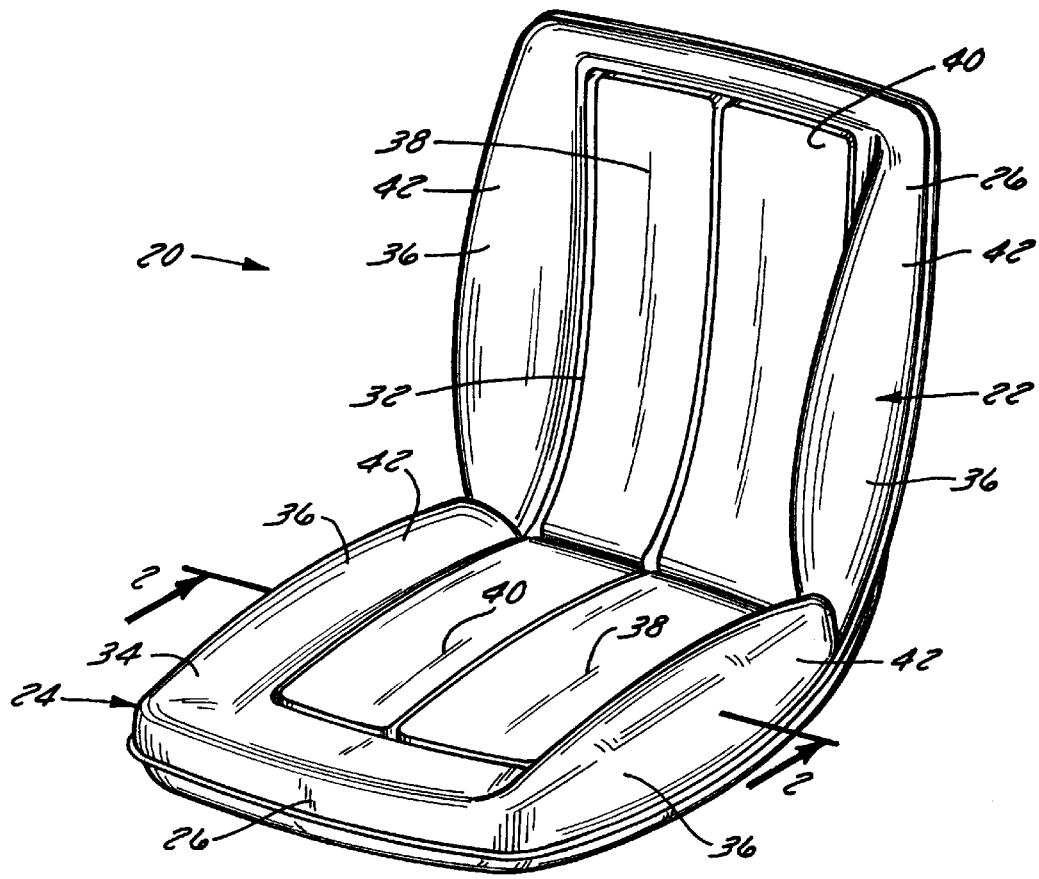
FIG. 1 is a perspective view of a vehicle seat having a pair of seat cushions constructed using the method of this invention.
Figure 2:
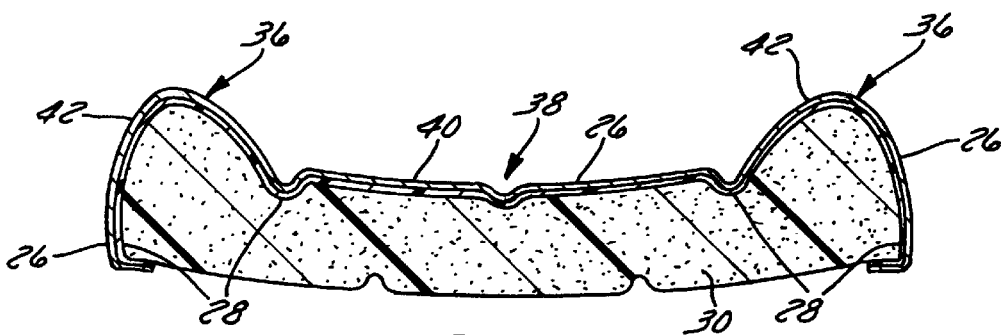
FIG. 2 is a cross sectional view of the bottom seat cushion taken along line 2—2 of FIG. 1.

FIGS. 1 & 2 illustrate a vehicle seat 20 having a pair of seat cushions 22 & 24, each of which is constructed of an outer covering of a fabric 26 with a film 28 applied to the cover 26, both of which are supported by a foam core base 30. Each cushion is constructed using a method of forming a fabric of this invention where the fabric of the cover 26 is: (a) not fixtured about its periphery during forming, (b) not immovably affixed to the film 28 during forming to permit relative movement to occur between the film 28 and fabric 26 during forming, and (c) cut to the size of the finished cushion seat cover before forming thereby minimizing fabric usage and permitting the film to function as a seal during vacuum forming and molding, all for enabling more durable woven fabrics, such as low stretch fabrics ordinarily used for cut-and-sew seat coverings, to be foam-in-place molded. Once forming and molding of a cushion is completed, the seat cover fabric 26 is bonded to the film 28 and the film 28 is secured over the foam 30, forming a seat cushion 22 of solid and preferably substantially unitary construction.

As is shown in FIG. 1, the vehicle seat 20 illustrated is a bucket seat that has the upper cushion 22 forming a backrest 32 of the seat 20 and the lower cushion 24 forming a weight supporting base 34 of the seat 20. Each article constructed using the method of this invention advantageously can be formed so it is three dimensionally contoured, such as is depicted by the seat cushions 22 & 24 shown in FIG. 1. As is illustrated in FIGS. 1 & 2, the bottom seat cushion 24 has an outwardly projecting upraised bolster 36 on each side of a central seat portion 38 for supporting while helping to position a person sitting in the seat 20.

A. Seat Cover Fabric

Preferably, the fabric 26 is a woven or knit cloth that can have relatively low stretch properties. Knitted fabrics may be either warp knit or circular knit, single knit or double knit. Nearly any type of natural, artificial, or synthetic fabric may be used, such as: leather, cowhide, cotton, wool, rayon, polyester, vinyl chloride, vinyl chloride acrylonitrile or polyacryl fiber, or another type of suitable cloth or fabric.

The method of this invention is particularly well suited for foam-in-place molding of fabrics that cannot be stretched a great deal, such as preferably fabrics which typically have been used to construct cut-and-sew seat covers. As such, if a low stretch woven cloth is used, it preferably can have less than 100% stretch and preferably can possess less than 50% stretch. To produce a seat cover on a finished cushion having good durability and wear resistance, the cloth 26 can preferably be a woven cloth having less than 50% stretch, such as the types of woven cloth typically used in the construction of cut-and-sew seat cushions.

Preferably, the fabric 26 is cut to a size such that, after forming and molding, virtually no trimming of the fabric 26 must be done to finish the cushion. Preferably, the fabric 26 is die cut, but it can also be cut to the desired size before forming by shearing, water jet cutting, gerber cutting, scissors cutting or another method of cutting.

Figure 3:
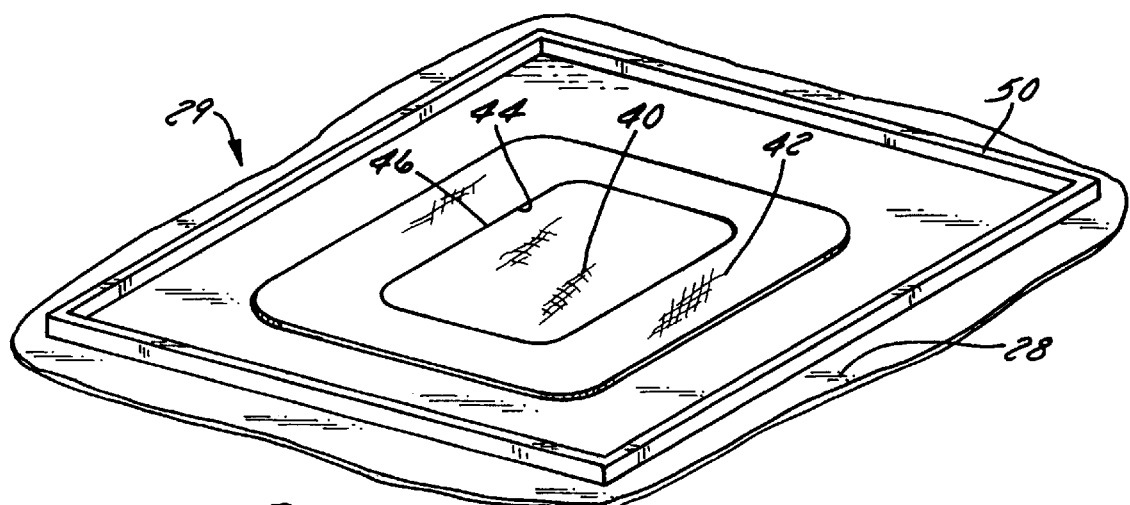
FIG. 3 is a perspective view of a seat cover blank having a layer of fabric carried by a sheet of film that is fixtured to a frame in preparation for constructing the cushion using the method of this invention.

To enable decorative or other effects to be achieved using the method of this invention, the seat cover 26 can be constructed of more than one piece of fabric, and can be embroidered or otherwise decorated before forming, all while conveniently remaining in a flattened state that is easy to handle. For example, as is shown in FIGS. 1 & 3, before forming, the cover 26 of the bottom seat cushion 24 can be constructed with a first piece of fabric 40 centrally located where a person sitting on the seat 20 would contact the cushion 24 and a second piece of fabric 42 surrounding the first fabric piece 40 and covering the seat bolsters 36. As is shown more clearly in FIG. 3, the inner fabric piece 40 is arranged relative to the outer fabric piece 42 so that its outer peripheral edge 44 abuts against or is adjacent to the inner peripheral edge 46 of the outer fabric piece 42. Preferably, the fabric pieces 40 & 42 are stitched together or otherwise joined together along these abutting or adjacent edges 44 & 46 but need not be if both pieces 40 & 42 are bonded to the film 28 along and adjacent their abutting edges 44 & 46. Advantageously, by using the method of this invention, the seams where the pieces of fabric abut each other need not be sealed, because the film 28 will seal the seams after forming and molding are completed.

B. Film

The film 28 is preferably constructed of a material that when heated, formed, and thereafter sufficiently cooled, the film 28 preferably substantially conforms to the shape of forming. After forming, the film 28 also preferably helps maintain the formed shape of the fabric 26. The film 28 preferably is a polymer or plastic that is preferably a urethane possessing good adhesion characteristics. Preferably, the film is a polyurethane. Alternatively, the film could be constructed of polyvinyl chloride, ethylene vinyl acetate, polyethylene, or a film that preferably can be heated to a temperature which facilitates forming and molding and which helps to fix the shape of the molded article after forming and molding are complete. Preferably, the film 28 is a urethane film constructed of a DEERFIELD resin PT9611T having a thickness of 0.0015 inches.

Preferably, the film 28 is at least somewhat elastic and is capable of being stretched during forming. Preferably, the film 28 can be stretched at least 150% during forming and is typically capable of being stretched up to about 200% to 300% or more.

Preferably, upon heating, the film 28 is made more pliable and stretchable to facilitate forming. Preferably, upon heating to a desired temperature, or within a desired temperature range, the shape memory of the film 28 can be reset so the film 28 can be stretched and formed without the film 28 seeking to return to its original shape after forming, with the film 28 substantially retaining the shape imposed upon it during forming. Preferably, the temperature at which the shape memory of the film 28 is reset is approximately equal to or below the activation temperature of the adhesive 52, but can be somewhat above or below the activation temperature if necessary.

To make the film 28 more pliable and formable, the film 28 is heated before forming to a temperature that is above at least about 100° Fahrenheit and preferably between about 230° and 250° Fahrenheit. Of course, depending upon the film material, it may be heated to higher or lower temperatures before forming. If desired, the film 28 may be heated to a higher temperature before forming so that if any cooling of the film 28 occurs before or during forming, the film will still be hot enough to be easily and suitably formed. Preferably, the temperature at which the shape memory of polyurethane film 28 can be reset so the film will substantially conform, for example, to the desired shape of a cushion after forming, is between approximately 230° and about 250° Fahrenheit, but greater than preferably about 100° Fahrenheit. Of course, routine experimentation may be required to determine optimum shape memory reset temperatures or temperature ranges for a given film or family of film resins. Routine experimentation may also be done to determine suitable and optimum heating characteristics when a film 28 is used with different types of fabrics 26 when practicing the method of this invention.

II. Frame and Fabric Tensioner Construction

Figure 6:
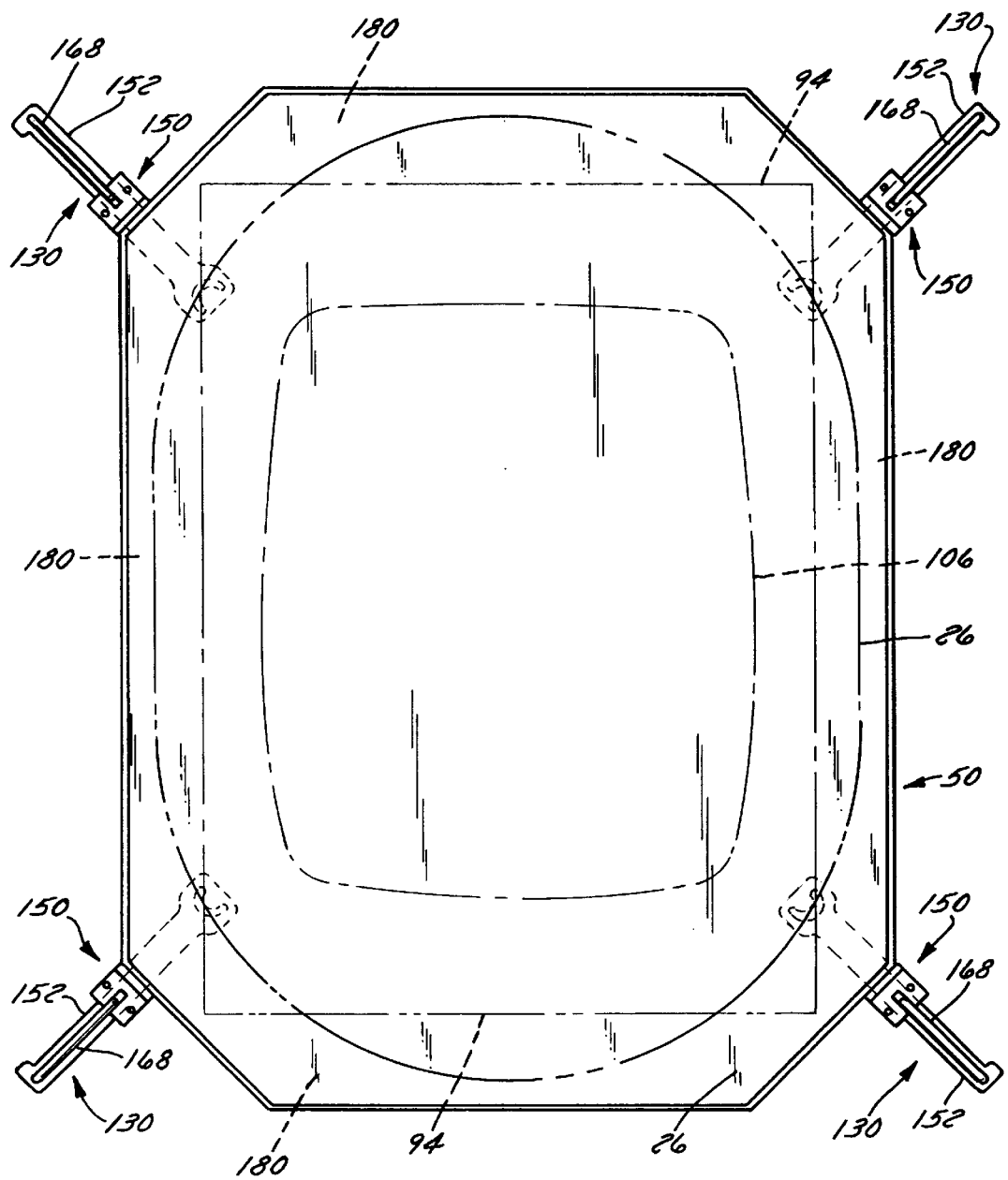
FIG. 6 is a top view of a seat cover blank fixtured to a frame having fabric tensioners for preventing buckling and wrinkling during forming of seat cover fabric, with the frame and blank placed over a mold having a sealing overlay.
Figure 7:
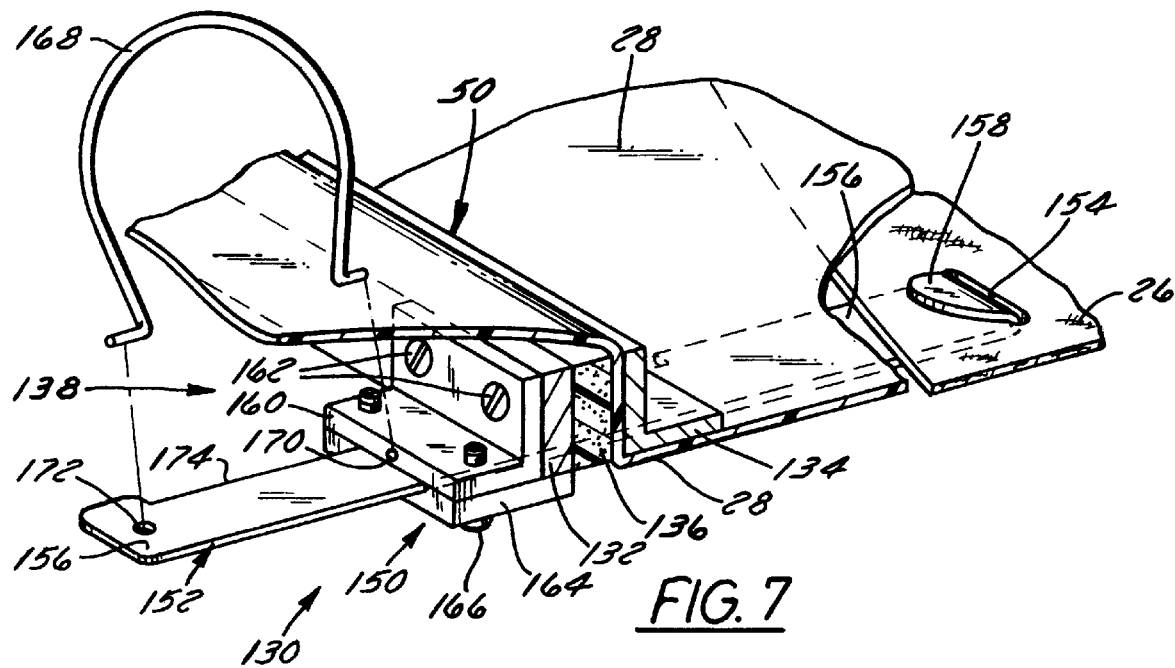
FIG. 7 is an enlarged fragmentary top perspective view of the frame with the film, of the seat cover blank clamped by the frame, broken away for illustrating the fabric tensioner in more detail.
Figure 8:
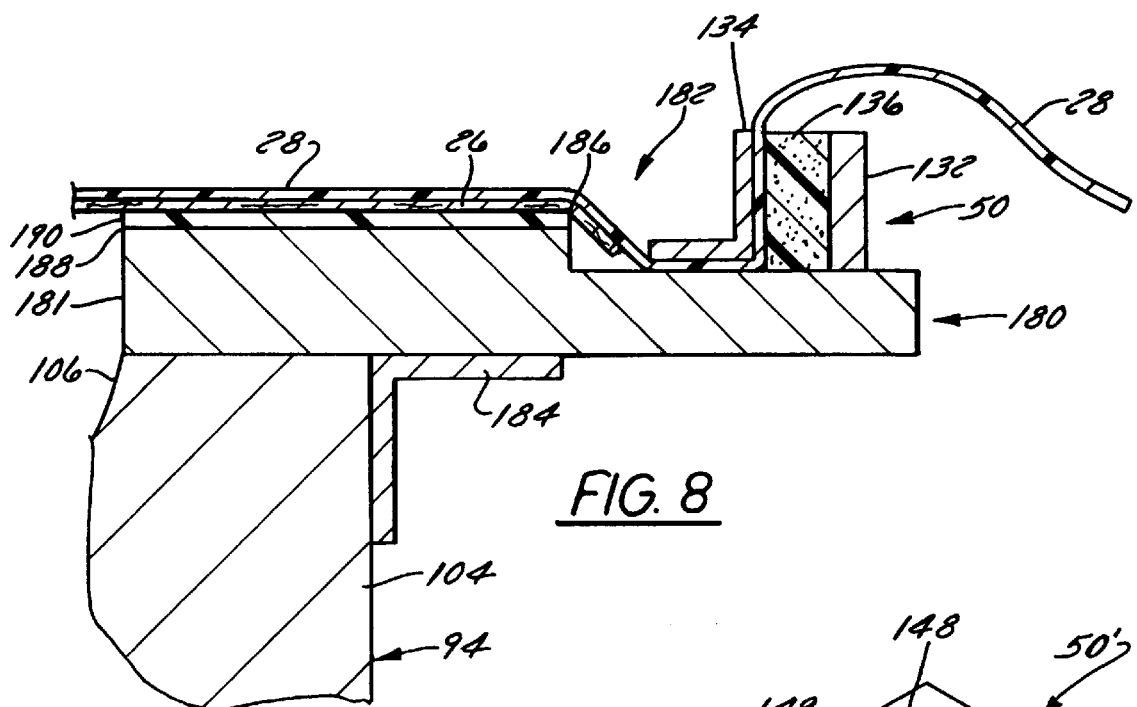
FIG. 8 is a fragmentary sectional view of a vacuum mold for forming the seat cover blank with a sealing overlay carried by the mold to help provide a vacuum seal of good integrity between the seat cover blank and mold.

FIGS. 6–8 illustrate a preferred embodiment of a frame construction 50 along with features of the frame 50 for facilitating forming of the fabric 26 and film 28. As is depicted in FIG. 6, after the film 28 has been fixtured to the frame 50, and after preheating, the frame 50 is placed over a mold 94 for forming. An exemplary mold 94 is shown in more detail in FIGS. 10–14. To prevent an undesirable amount of compressive stress from building up in the fabric 26 during forming and possibly causing buckling and wrinkling of the fabric 26, the frame 50 preferably has one or more fabric tensioners 130 for engaging the fabric 26 during forming to selectively apply tension to the fabric 26 adjacent where the compressive stresses can build up during forming.

A. Frame

As is shown more clearly in FIGS. 7 & 8, the frame 50 has a support channel 132 that engages the film 28 of the fabric and film blank 29 when a clamping bracket 134 is brought to bear against the support channel 132. The clamping bracket 134 can be an L-shaped angle iron that is relatively rigid to clamp the film 28 against a support channel 132 that is also preferably relatively rigid. To facilitate clamping without damaging the film 28, which is relatively thin, there preferably is a support pad 136 between the support channel 132 and clamping bracket 134. Preferably, the support pad 136 is attached to the support channel 132 and the film 28 is located between the pad 136 and clamping bracket 134 when it is clamped in the frame 50. Preferably, the support pad 136 is a resilient material that can compress at least slightly during clamping. Preferably, the support pad 136 is constructed of a compressible and resilient material such as an open cell foam. Preferably, the frame 50 has frame tighteners 138 that engage the support channel 132 and clamping bracket 132 to secure the film 28 to the clamp 50. An exemplary adjustable frame tightener 138, shown in FIG. 7, is a fastener 140 having a bolt 142 with its shank received through an opening in each of the support channel 132, clamping bracket 134 and support pad 136 and which is threadably secured by a nut 144. Preferably, the frame tighteners 138 are adjustable to control and desirably vary frame clamping pressure on the film 28.

While the support channel 132 is preferably a closed loop that completely encompasses the fabric 26 on the blank 29, the clamping bracket 134 can be comprised of one or more brackets that are secured to the support channel 132 at various places around the channel 132 to clamp the film 28 in the frame 50. Preferably, clamping pressure of the frame 50 can be controlled and varied to permit some relative movement to occur between the film 28 and frame 50 during forming, if desired. Additionally, if desired, clamping pressure may be controlled and varied at different locations around the frame 50 to permit some relative movement between the film 28 and frame 50 to reduce some stretching of the film 28 during forming at certain areas of the blank 29 to optimize forming. If desired, clamping pressure can also be preferably adjusted such that there is no relative movement between the film 28 and frame 50 during forming, at least at some locations around the frame 50.

As is shown more clearly in FIG. 8, the film 28 can be oriented in the frame 50 such that it bears directly against a vacuum sealing surface, such as the top surface of the mold 94 (FIGS. 10–14) or the top surface of an overlay 180 carried by a mold (FIG. 8) for maximizing the vacuum seal of the film 28 about the periphery of the mold 94. Preferably, the film 28 is clamped in the frame 50 in the manner shown in FIG. 8 such that it enters the frame 50 between the frame 50 and a sealing surface of the mold 94 or overlay 180 to maximize the vacuum seal between the film 28 and mold 94.

Figure 9:
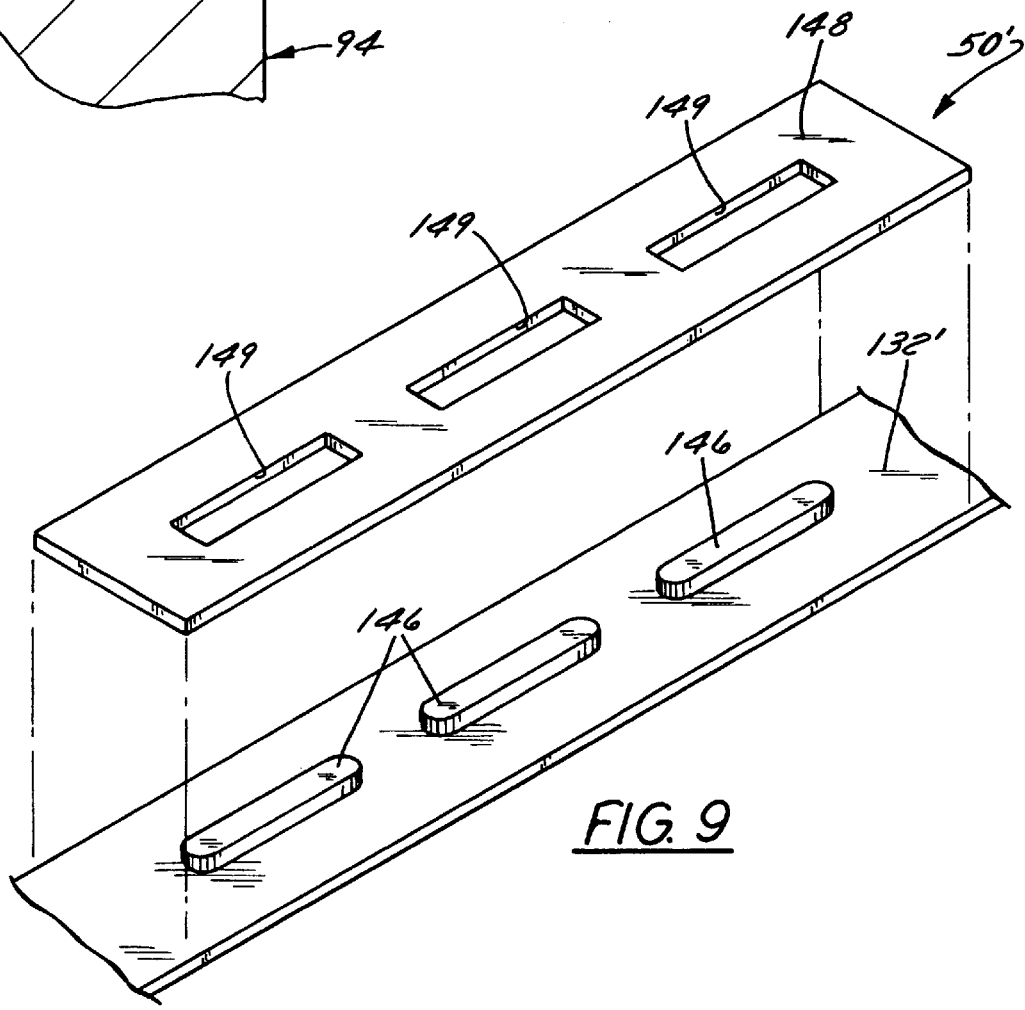
FIG. 9 is a fragmentary perspective view of a clamping mechanism for securing the seat cover blank to the frame.

Another preferred embodiment of the frame 50' is shown in FIG. 9. As is depicted in FIG. 9, the support channel 132' is flat and has upraised fingers 146 for receiving a clamping collar 148 that has detents or openings 149 which correspond in location to the clamping fingers 146. To clamp the blank 29 to the frame 50', the film 28 of the blank 29 is placed over both the support channel 132' and the fingers 146, and the clamping collar 148 is placed over the film 28 such that the fingers 146 are received in its openings 149 thereby clamping the film 28 between the support channel 132' and clamping collar 148.

Figure 4:
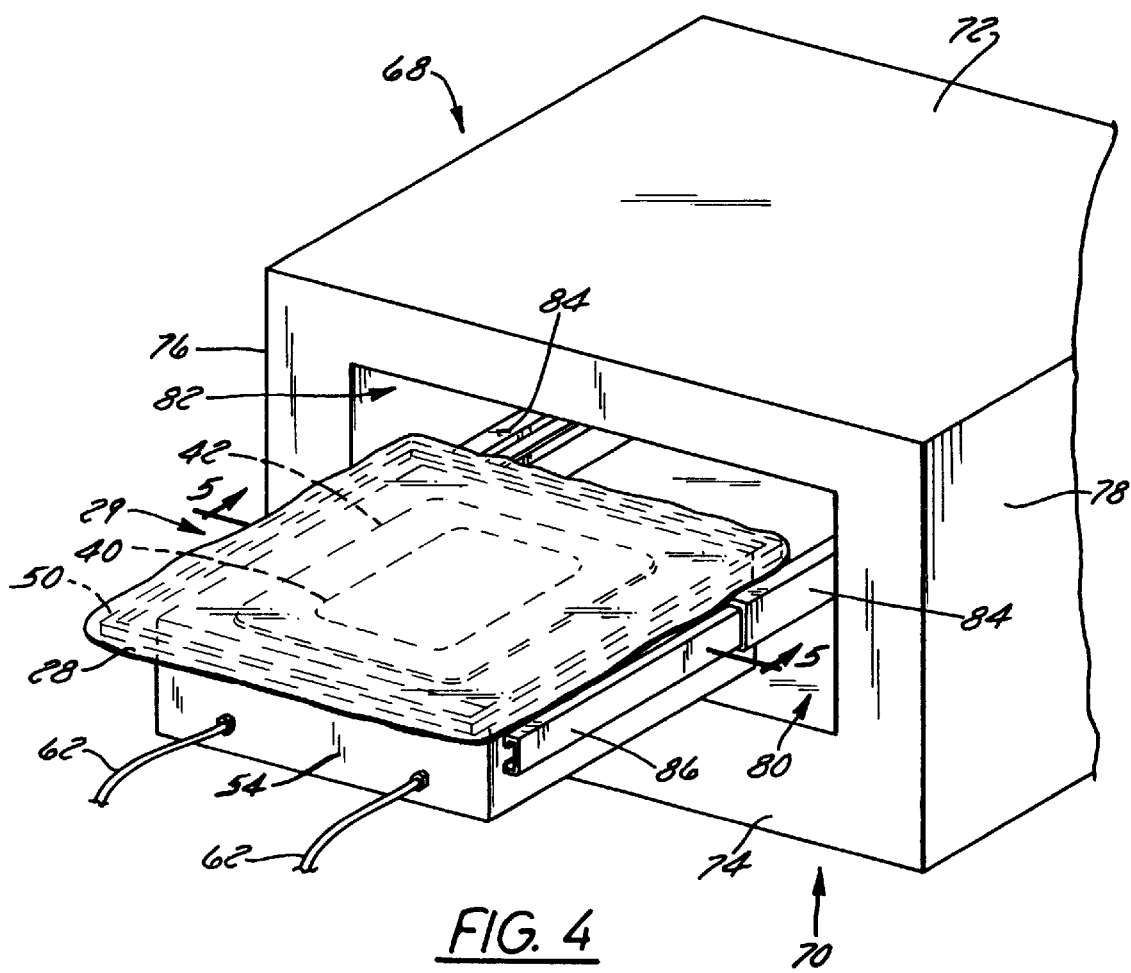
FIG. 4 is a perspective view of the seat cover blank placed over a vacuum table that is adjacent an oven for tacking the fabric to the film.

Although a frame 50 of a square shape, such as is shown in FIGS. 3, 4 & 10, may be used, a generally octagonal frame (FIG. 6) may be used such as when fabric tensioners 130 are mounted to its corners. In some instances, it may be desirable to have a frame 50 having a shape that imparts certain favorable stretch characteristics to the film 28 during forming. For example, a frame of a non-square or non-octagonal configuration could be used to impart certain stretch characteristics to the blank 29 during forming in certain regions of the blank 29 and other stretch characteristics in other regions of the blank 29.

B. Fabric Tensioners

As is shown in FIG. 6, the fabric tensioners 130 are attached to the frame 50 at each corner of the fabric and film seat cover blank 29 and engage the fabric 26 to reduce and preferably prevent compressive stresses from excessively building up in the fabric 26 during forming. Although fabric tensioners 130 are shown at each corner of the blank 29, placement of tensioners 130 can vary depending upon where undesirable compressive stresses in the fabric 26 are most likely to occur or build-up during forming. In fact, for a given mold configuration and fabric type, routine experimentation and research may be performed to determine where compressive stresses in the fabric 26 are most likely to undesirably build-up or occur so tensioners 130 can be located to engage the fabric 26 adjacent to or at those positions. However, if routine experimentation and testing reveals no areas of the fabric that buckle and wrinkle during forming for a given fabric and mold setup, the frame 50 can be used without any fabric tensioners 130.

Preferably, as is shown in FIG. 7, each fabric tensioner 130 has a mount 150 attached to the frame 50 with a hook 152 carried by the mount 150 that engages a notch or slit 154 in the fabric 26 to apply tension to the fabric 26 in that location for, at least lightly, resisting the fabric 26 from flowing into the mold cavity 106 of the mold 94 during forming. To engage the fabric 26, each hook 152 preferably has a shank 156 with a lip 158 at the end of the shank 156 that is received in the notch 154 of the fabric 26. The lip 158 of hook 158 is preferably slightly upraised relative to the shank 156.

As is shown in FIG. 7, the fabric tensioner mount 150 is a generally L-shaped angle iron 160 that is secured by fasteners 162 to the frame 50. To enable the hook 152 to move relative to the frame 50 during forming, the hook 152 is slidably received between a leg of the angle iron 160 and a slide plate 164 mounted by fasteners 162 to the angle iron 160.

To impart resistance to the movement of the hook 152. The hook 152 is preferably biased by a spring 168 to pull or urge the fabric 26 away from the mold cavity 106 thereby resisting movement of the fabric 26 toward the cavity 106 during forming, at least slightly. By resisting movement of the fabric 26 toward the mold cavity 106, the spring-biased hook 152 applies tension to the fabric 26 adjacent to and in the region where the hook 152 engages the fabric 26 for counteracting the occurrence and build-up of compressive stresses in the fabric 26 in that same region thereby minimizing and preferably substantially preventing buckling and wrinkling of the fabric 26 in that region when forming is completed. Preferably, the spring 168 is constructed out of a loop of wire of a spring steel, or the like, such as piano wire. As is indicated by the dashed lines in FIG. 7, each end of the loop is outturned for being received at one end in a pocket 170 in the mount 150 and received at its other end in an opening 172 in the hook 152. Although a loop of piano wire functions as a spring 168 in a preferred embodiment of the fabric tensioner 130, a coil spring in tension or compression could also be used. To enable controlled movement of the hook 152 relative to the frame 50 within desired limits, the shank 156 of the hook 152 is preferably notched 174 where it is received by the mount 150.

Figure 7A:
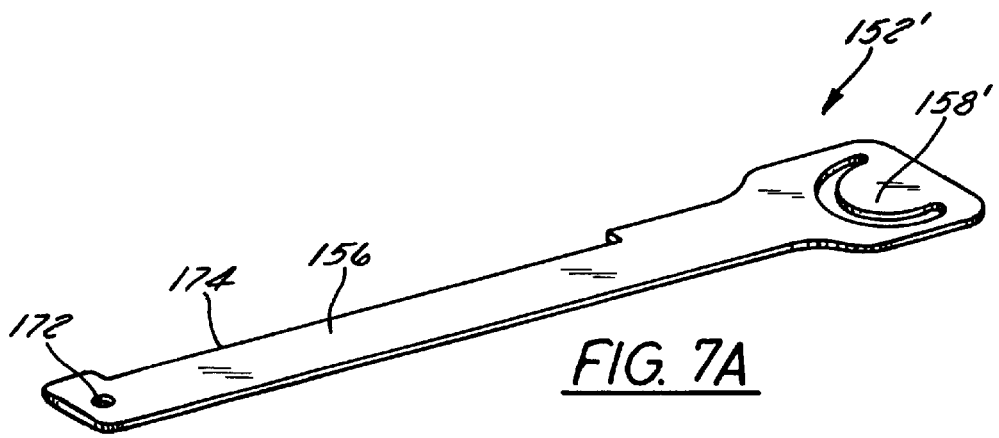
FIG. 7A illustrates a preferred embodiment of a fabric tensioning hook.

In another preferred embodiment of a fabric tensioner hook 152', shown in FIG. 7A, the lip is a flexible tab 158' preferably substantially flush with the shank 156. Hook 152 or 152' can be constructed of a resilient and flexible material such as a polymeric material and/or plastic for permitting the hook 152 or 152' to flex during forming and for making it easy to use when attaching the hook 152 or 152' to the fabric 26 before forming. Preferably, hook 152' is constructed of a flexible and resilient material.

Although the hook 152 and 152' has a lip 158 or tab 158' for engaging the fabric 26, other methods and mechanisms for engaging the fabric 26 could be used. For example, a clamp (not shown) having fingers which grip fabric between the fingers could also be used. Alternatively, a type of hook and loop fastener, such as VELCRO, that engages the fabric 26 could also be used.

III. Overlay and Sealing Channel

After preheating and during molding, to help form a seal of good integrity between the film 28 and a sealing surface of the mold 94, the frame 50 can be received in a recessed sealing channel 182 in an overlay 180 (FIG. 8) or in a recessed sealing channel 182 in the mold 94 (FIGS. 10–14) when the frame 50 is placed over the mold 94. Preferably, the overlay 180 is used to provide such a sealing channel 182 for molds 94 not having a sealing channel in situations where a more positive vacuum seal is desired to be created between the blank 29 and mold 94 during forming.

Referring to FIGS. 6 & 8, the overlay 180 has an opening 181 that overlies the mold cavity 106 for permitting the blank 29 to be drawn into the mold cavity 106 during forming. The sealing channel 182 of the overlay 180 can be constructed and arranged so that the channel 182 extends completely about the periphery of the mold cavity 106. However, where fabric tensioners 130 are used, the sealing channel 182 may extend to encompass less than the periphery of the mold cavity 106, particularly where clearance for a tensioner 130 is required. For example, for the mold setup shown in FIG. 6, to enable fabric tensioners 130 to be used along with an overlay 180, the sealing channel 182 may only extend along the sides of the overlay 180 and not its corners. When the overlay 180 is placed on a mold 94 having a top surface 100 that is smaller than the overlay 180, at least a portion of the overlay 180 can be carried by one or more supports 184 attached to the mold 94. Such supports 184 can be used to carry the frame 50 on a smaller mold, when an overlay 180 is not used. Preferably, each support 184 would extend sufficiently outwardly from the base 104 of the mold 94 to carry the frame 50 when an overlay 180 is not used.

As is depicted in FIG. 8, the sealing channel 182 helps to improve the seal between the mold cavity 106 and frame 50 by creating a pinch point 186 with the overlay 180 where the film 28 is pulled downwardly, because the frame 50 is received in the channel 182. The sealing channel 182 is advantageous where relatively thick and/or porous seat cover fabrics 26 are used for providing an adequate seal despite the thickness and/or porosity of the fabric 26.

The sealing channel 182 is also particularly advantageous where fabrics 26 are used and when the fabric 26 of a blank 29 extends outwardly beyond the periphery of the mold cavity 106, such as is depicted in FIG. 8. This is because at the pinch point 186 the fabric 26 is compressed, reducing vacuum loss to the exterior of the mold cavity 106. By compressing the fabric 26 between the film 28 and overlay 180 at the pinch point 186, pores in the fabric 26 are closed or dramatically reduced in size to reduce and preferably significantly prevent outside air from entering the mold cavity 106 during forming.

To prevent friction between the top surface 188 of the overlay and the blank 29, the top surface 188 preferably is coated with a low friction material 190, such as preferably TEFLON. The low friction material 190 can be a coating or in the form of a tape. Preferably, to facilitate flow of the blank 29 into the mold cavity 106 during forming, the top surface 100 of the mold 94 can also be coated with such a low friction coating, such as TEFLON. By coating the top surface with a low friction material, friction between the blank 29 and top surface is reduced, reducing molding time while also reducing and preferably virtually eliminating the need to manually urge the blank 29 into the mold cavity 106 when the blank 29 does not uniformly flow into the mold cavity 106 during forming.

IV. Molding Process

A. Setup

FIGS. 3–16 illustrate the method of this invention for molding articles, such as preferably seat cushions and the like. In practicing the method, the film 28 and seat cover fabric 26 are both preheated to cause them to adhere to each other, preferably without firmly bonding them together so that they can move relative to one another, or slide, during forming to minimize the amount of stretching required of the seat cover fabric 26. Also to minimize stretching of the fabric 26 during forming, the film 28 is fixtured, preferably about its periphery, while the seat cover fabric 26 is (1) carried by the film 28 and (2) not fixtured or secured about its periphery. As a result, during molding, the film 28 stretches as it is formed while the seat cover fabric 26 substantially conforms to the shape taken by the film 28 during forming minimizing stretching of the fabric 26. After forming, the shape of the film 28 and fabric 26 are preferably fixed as the fabric 26 is preferably bonded to the film 28. The shape memory of the film 28 is also preferably set to the three dimensional contour taken by the film 28 after forming is completed. After forming or after the shape of the film 28 and fabric 26 are set, foam is preferably poured into the formed fabric 26 and film 28, and the foam is allowed to harden to form an article of manufacture, such as preferably a seat cushion 24 or the like.

As is shown more clearly in FIG. 3, a piece of film 28 is fixtured, preferably at points about its periphery, in a frame 50 for retaining the film 28 and holding the film 28 securely during forming and molding, thereby enabling the film 28 to be stretched during forming. The fabric seat cover 26 can be placed on the film 28, forming a seat cover blank 29 with an adhesive 52 (FIG. 5A) between the film 28 and fabric 26. Preferably, however, the fabric 26 is placed on a vacuum table 54 with the film 28 and frame 50 placed over the fabric 26 with the adhesive 52 being between the film 28 and fabric 26.

Referring to FIG. 4, after the frame 50 is placed over the vacuum table 54 and while a vacuum is applied against the film 28 and fabric 26, the adhesive 52 tacks the fabric 26 to the film 28 for permitting relative movement to occur between the fabric 26 and film 28 during forming, before bonding the fabric 26 to the film 28 after forming is complete. Preferably, after the frame 50 is placed over the vacuum table 54 and while a vacuum is applied against the film 28 and fabric 26, at least the adhesive 52 is heated to cause it to activate so the adhesive 52 will tack the fabric 26 to the film 28 and, after sufficient cooling, securely bond the film 28 to the fabric 26 preferably after forming is completed.

B. Preheating

FIG. 3 illustrates the film 28 secured about its periphery and received in the frame 50 with the inner fabric blank 40 and outer fabric blank 42 laying on the film 28. To enable the film 28 to be stretched during forming, the film 28 is secured preferably about or adjacent its entire periphery to the frame 50. To minimize the amount of stretching required of the fabric 26 during forming, the fabric 26 is not secured to the frame 50.

As is shown in FIGS. 4 & 5, after the film 28 is secured to the frame 50, the seat cover fabric 26 is placed on the vacuum table 54 and the frame 50 and film 28 are placed over the fabric 26 and table 54. To enable the film 28 to act as a seal with the table 54 so the film 28 is tightly drawn into intimate contact with the fabric 26 during operation of the vacuum table 54, the frame 50 is placed over the table 54 such that the seat cover fabric 26 bears against the table 54 and the film 28 overlies the fabric 26.

Referring more particularly to FIG. 5, the vacuum table 54 has a sealed enclosure 56 and a preferably generally flat table top 58 defining an interior cavity 60 within the enclosure 56. One or more suction lines 62 (FIG. 4) are sealingly attached to the vacuum table enclosure 56 and communicate with the interior cavity 60 to enable air to be removed from the cavity 60 to reduce pressure within the cavity 60 and create a vacuum inside the table 54. Any suction line 62 attached to the table 54 communicates at its opposite end with a vacuum source (not shown) such as a vacuum pump, venturi, an ejector, or another mechanism for introducing a vacuum within the interior cavity 60 of the vacuum table 54. To communicate the vacuum to the fabric 26 and film 28 during vacuum table operation to draw the film 28 tightly against the fabric 26, the table top 58 has a plurality of passages 64 leading from the interior cavity 60 to the exterior of the table 54. To support the frame 50 on the table 54, the table 54 can have extensions, such as angle iron (not shown), which extend outwardly and underneath the frame 50. Alternatively, the vacuum table 54 can be constructed with a table top 58 that is large enough such that the frame 50 is supported by the table top 58.

Figure 5B:
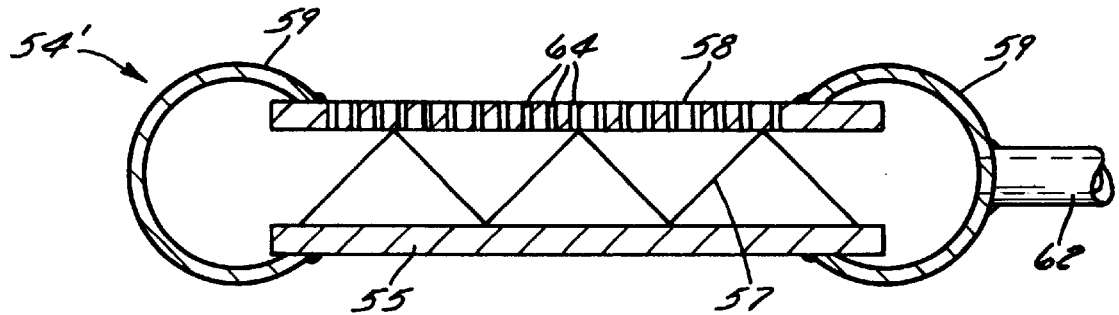
FIG. 5B is a cross sectional view of a preferred embodiment of the vacuum table.

Another preferred embodiment of the vacuum table is the vacuum table 54' depicted in FIG. 5B. Preferably, the vacuum table top 58 is large enough to receive and support the frame 50 without requiring any separate extensions or supports. The table 54' has a bottom wall 55 separated from the top wall 58 by a spacer 57 that preferably is a wire of a spring-type steel, such as piano wire. The vacuum table 54' has a pair of sealing sidewalls 59 which preferably are tubes of a flexible and resilient material cut to received the top wall 58 and bottom wall 55 of the table 54'. To enable a vacuum to be created within the table, one of the sealing walls 59 is in communication with a suction line 62 that is attached to a vacuum source.

As is depicted in FIG. 5A, a layer 66 of adhesive 52, that is preferably a heat activated, thermoplastic adhesive, is placed between the film and fabric. Preferably, the adhesive 52 is a heat activated, polyamide adhesive. Alternatively, other types of adhesives that are heat activated can also be used, such as a solvent-based adhesive, plastisol, a suitable spray-type adhesive, a suitable brush-type adhesive, or another suitable adhesive. When heated above its activation temperature, the adhesive 52 will activate and also adhere to the film 28 so that the fabric 26 is at least retained on the film 28, even when the adhesive 52 has not fully and permanently bonded the fabric 26 to the film 28.

Preferably, when maintained above its activation temperature, the adhesive 52 is at least somewhat fluid-like and tacky so it causes the fabric 26 to adhere to the film 28 while allowing the fabric 26 to slide relative to the film 28 during forming to minimize how much the fabric 26 must stretch during forming. Preferably, when the adhesive temperature is thereafter lowered below the activation temperature, such as preferably after forming is completed, the adhesive 52 sets, bonding the fabric 26 to the film 28 and thereby not allowing the fabric 26 to move relative to the film 28.

The adhesive 52 is preferably a layer 66 of adhesive 52 that is between the fabric 26 and film 28. Preferably, the adhesive layer 66 is preapplied to the fabric 26 before preheating. Alternatively, the adhesive 52 can be a layer or sheet of adhesive placed between the film 28 and fabric 26 or an adhesive 52 that has been selectively applied to certain areas of the film 28 and/or fabric 26. Where substantially complete and uniform bonding of the fabric 26 to the film 28 is desired, the adhesive 52 is substantially continuously distributed between the film 28 and fabric 26. Where it is desirable to preprogram special seat cushion effects, such as to create wrinkles at specific places on the finished seat cushion to enhance the appearance of the cushion, the adhesive is selectively applied, such as to only certain areas of the fabric 26 and/or film 28.

During preheating and while a vacuum is being applied against the film 28 to draw the film 28 tightly against the fabric 26, heat is also applied to activate the adhesive 52 between the film 28 and fabric 26. In addition to the adhesive being heated, the film 28 is also heated, preferably to reset its shape memory enabling it to be formed without the film 28 attempting to return to its original shape after forming is completed. Additionally, during preheating, the fabric 26 is also heated, preferably enhancing its ability to be stretched and formed.

As is shown in FIG. 4, to heat the adhesive 52, film 28, and fabric 26, the vacuum table 54 is placed within a heat source 68 that preferably is an oven 70. The oven 70 has a pair of spaced apart top walls 72 & 74 and a pair of spaced apart side walls 76 & 78 and an opening 80 leading into a cavity 82 between the walls 72, 74, 76 & 78 for enabling the vacuum table 54 to be placed within the oven cavity 82 to preheat the adhesive 52, film 28, and fabric 26. To enable the vacuum table 54 to be quickly and easily put into and removed from the oven 70, the table 54 is preferably carried on a pair of tracks 84 extending from the oven 70 slidably connected, preferably by bearings, to a pair of slides 86 attached to the sidewalls 76 & 78 of the oven 70.

The oven 70 can utilize radiant heat to transfer heat to the adhesive 52, film 28, and fabric 26 during preheating. Of course, during preheating, some heat transfer to the adhesive 52, film 28, and fabric 26 may occur by air movement within the oven 70 and conduction of heat from the oven 70 through the tracks 84 and slides 86 to the vacuum table 54. The air movement may be natural, such as by free convection, or by using a fan or blower, such as by forced convection. Alternatively, heat may be transferred to the adhesive 52, film 28 and fabric 26 using primarily forced convection, such as by an oven that directs a stream of heated air or steam onto the adhesive 52, film 28, and fabric 26. Within the oven 70, the vacuum table 54 also prevents the film 28 from overheating and melting by acting as a heat sink, should the oven 70 become too hot during preheating.

Alternatively, the vacuum table 54 may be constructed with an integral contact-type heater for heating the adhesive 52, film 28 and, if desired, fabric 26. For example, strip heaters of copper could be constructed as part of the table top 58 of the vacuum table 54 for using an electrical power source to heat the blank 28. These strip heaters could use induction or resistance heating to preheat the blank 29.

During preheating, the frame 50 is placed over the vacuum table 54 and the table 54 is placed into the oven 70. With a vacuum applied to draw the film 28 tightly against the fabric 26, the adhesive 52, film 28, and fabric 26 are heated to a temperature to enable the blank 29 to be successfully formed. Preferably, during preheating, the blank 29 is heated to a temperature that helps make the film 28 more pliable and stretchable during forming for facilitating forming. Additionally, during preheating, heat is applied to the blank 29 to cause the adhesive 52 to be activated. Preferably, by application of heat to the blank 29, the adhesive 52 is heated to a temperature that preferably is above its activation temperature.

Therefore, the adhesive 52, film 28, and fabric 26 are preferably heated to a temperature that is also at or above the temperature that causes the shape memory of the film 28 to be reset so that the film 28 will be relatively pliable and moldable after preheating and later during forming by vacuum molding while retaining the shape it assumes during forming upon the blank 29 cooling to a sufficiently low temperature. To prevent the fabric 26 from shrinking during preheating, such as when it is in the oven 70, the table top 58 of the vacuum table 54 preferably has a high friction surface, such as a surface that has been roughened.

During preheating, a vacuum of at least about 5 inches of mercury (Hg) is applied by the vacuum table 54 to draw the film 28 against the fabric 26. Preferably, a vacuum of between about 8 inches of mercury (Hg) and about 20 inches of mercury (Hg) is applied to draw the film 28 into tight intimate contact with the fabric 26. For different films and fabrics, and different combinations of films and fabrics, routine experimentation may be required to optimize the amount of vacuum required to tack the fabric to the film during preheating by drawing the film into tight intimate contact with the fabric and which firmly bonds the fabric 26 to the film 28 after being cooled to a sufficiently low temperature.

During preheating, the oven 70 operates at a temperature of at least about 250° Fahrenheit and preferably within a range of approximately 420° to 450° Fahrenheit to heat and preferably activate an adhesive 52 that is preferably a polyamide adhesive having an activation temperature of, for example, approximately 250° Fahrenheit. To facilitate the stretching of the film 28 and fabric 26 during forming and to maintain the temperature of the adhesive 52 above its activation temperature during forming, the oven 70 heats the film 28, fabric 26 or adhesive 52 until they reach a temperature of at least 200° Fahrenheit, and preferably until a temperature of approximately 280° to about 300° Fahrenheit is reached. Preferably, the oven 70 heats the film 28, fabric 26, and adhesive 52 until they reach a temperature of between about 280° and 300° Fahrenheit. For other combinations of film 28, fabrics 26 and adhesives 52, routine experimentation may be required to determine the appropriate oven operating temperature or temperatures that heat the adhesive 52, film 28 and/or fabric 26 to the desired preheat temperature.

Preferably, the oven 70 also heats the film 28 to a temperature that enables its shape memory to be reset to the shape the film 28 takes after forming to help fix the shape of the seat cover 26 to the post-forming shape. Therefore, the adhesive 52 and film 28 are preferably heated to a temperature that is above both the activation temperature of the adhesive 52 and temperature at or above which the shape memory of the film 28 is reset. The shape memory reset temperature of the film 28 is preferably the temperature at or above which the shape memory of the film 28 is reset so it can become substantially set to the shape of the film 28 takes during forming and after its temperature has been sufficiently lowered by cooling.

During preheating, the adhesive 52 preferably softens sufficiently so it becomes at least somewhat fluid-like to cause at least some of the adhesive 52 to migrate into the seat cover fabric 26 while adhesive 52 also preferably comes into contact with the film 28, preferably wetting the film 28. With the application of vacuum while the adhesive 52 is in this preferably fluid-like state, the film 28 is able to be tightly drawn against the fabric 26 and into intimate contact with the fabric 26, such as by the vacuum table 54 during preheating, resulting later in a permanent bond of good integrity and high strength after cooling of the adhesive 52, which can occur during forming or after forming has been completed.

With the adhesive 52 in a fluid-like state, it causes the fabric 26 to adhere to the film 28 while allowing some relative movement, or sliding, to occur between the film 28 and fabric 26 during forming. By maintaining the adhesive 52 in a fluid-like state during forming, enabling the seat cover fabric 26 to slide on the film 28 during forming, it minimizes how much the fabric 26 must stretch during forming. With the adhesive 52 in a fluid-like state, rupture of the film 28 and/or fabric 26 during forming is also advantageously minimized and preferably prevented because the fabric 26 can move relative to the film 28 during forming.

During preheating, the temperature of both the film 28 and adhesive 52 are both raised to a temperature that is suitably above the shape memory reset temperature of the film 28 and the activation temperature of the adhesive 52 so that the temperature of the film 28 and adhesive 52 will not fall below the activation temperature and shape memory reset temperature before forming is completed. Therefore, the temperature of the film 28 and adhesive 52 is preferably maintained sufficiently above the activation temperature of the adhesive 52 and shape memory reset temperature of the film 28 so (a) that the adhesive 52 remains tacky permitting relative movement between the fabric 26 and film 28 during forming and (b) the shape memory of the film can be set to the shape taken upon forming even if some cooling of the adhesive 52 and/or film 28 occurs during forming.

C. Forming

While the adhesive 52 is still sufficiently hot such that relative movement between the fabric 26 and film 28 can occur, the frame 50 is placed over a mold 90 with the fabric 26 against the mold 90 and the seat cover fabric 26 and film 28 are drawn against the inner contours of the mold 90 to three dimensionally form the seat cover blank 29. As is depicted in FIG. 10, the mold 90 preferably is a clamshell mold 90 having an upper mold 92 and a lower mold 94, that preferably is a vacuum mold, connected by a hinge 96 for enabling the upper mold 92 to be closed over the vacuum mold 94 after foam has been poured into the vacuum mold 94.

If one or more fabric tensioners 130 are used, each hook 152 is engaged in a corresponding slit or notch 154 in the fabric 26 of the blank 29 to apply tension to the fabric 26 during forming to prevent buckling and wrinkling of the fabric 26 during forming. As the fabric 26 is drawn into the mold cavity 106 during forming, the spring 168 of each tensioner 130 resists movement of its hook 152 inwardly toward the cavity 106 thereby applying tension to the fabric 26 in the region where it is engaging the fabric 26. By applying tension to the fabric 26 in select areas of the fabric 26, it can resist the occurrence or buildup of compressive stresses in the fabric 26 which can ordinarily, without the use of fabric tensioners 130, undesirably lead to buckling and wrinkling of the fabric 26 during forming.

The upper mold 92 has a face 98 that mates against a complementary surface 100 (FIGS. 11–13) of the vacuum mold 94 when the upper mold 92 is closed after the foam has been poured. The upper mold 92 also has a mold cavity 102 that is three dimensionally contoured for controlling the final shape of the foam core 30 of the cushion 24 during curing of the foam and after it has hardened, preferably so the cushion 24 can be received in a chassis (not shown) of a seat.

Figure 11:
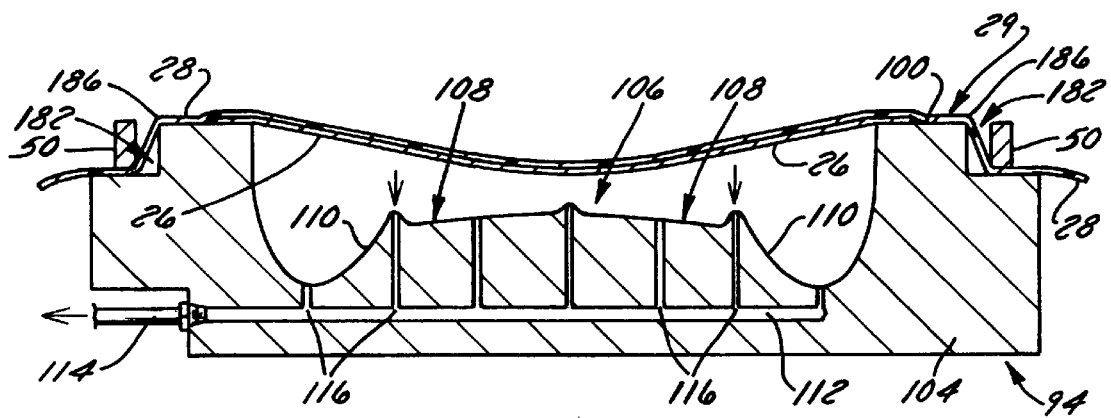
FIG. 11 is a cross sectional view of the vacuum mold and seat cover blank depicting the blank being drawn against the mold during forming by application of a vacuum in a cavity of the mold.

Referring additionally to FIG. 11, the vacuum mold 94 has a base 104 with its mating surface 100 also functioning as a sealing surface that seals against the film 28 when a vacuum is applied to the mold 94 during forming. The base 104 of the mold 94 has a cavity 106 therein with a mold cavity surface 108 that is three dimensionally contoured for imparting the contour to the seat cover blank 29 after forming has taken place. As is shown in FIG. 11, the mold cavity has a pair of spaced apart depressions 110 for forming the seat bolsters 36 when the fabric 26 and film 28 are drawn against the three dimensionally contoured mold cavity surface 108.

To enable the fabric 26 and film 28 to be drawn downwardly into the mold cavity 106 during vacuum forming, the base 104 of the mold 94 has a central vacuum channel 112 that communicates at one end with one or more suction lines 114 attached to a vacuum source (not shown). Distributed about the mold cavity surface 108 are a plurality of vacuum ports 116 which open into the mold cavity 106 and communicate with the central vacuum channel 112 enabling a vacuum to be created within the mold cavity 106 to draw the seat cover fabric 26 and film 28 toward and against the mold cavity surface 108.

As is shown in FIG. 11, during forming, a vacuum is created within the mold cavity 106 causing the film 28 to seal directly against the sealing surface 100 of the vacuum mold 94 for producing a seal of good integrity that is maintained throughout forming. The vacuum draws the seat cover blank 29 downwardly into the cavity 106 toward the mold cavity surface 108 until the fabric 26 bears against the mold cavity surface 108, as is depicted in FIG. 12, causing the seat cover blank 29 to conform to the shape of the surface 108.

During forming, to draw the fabric 26 and film 28 against the mold cavity surface 108, a vacuum of at least about ten inches of mercury, and preferably at least about fifteen inches of mercury, is created within the mold cavity 106.

Figure 12:
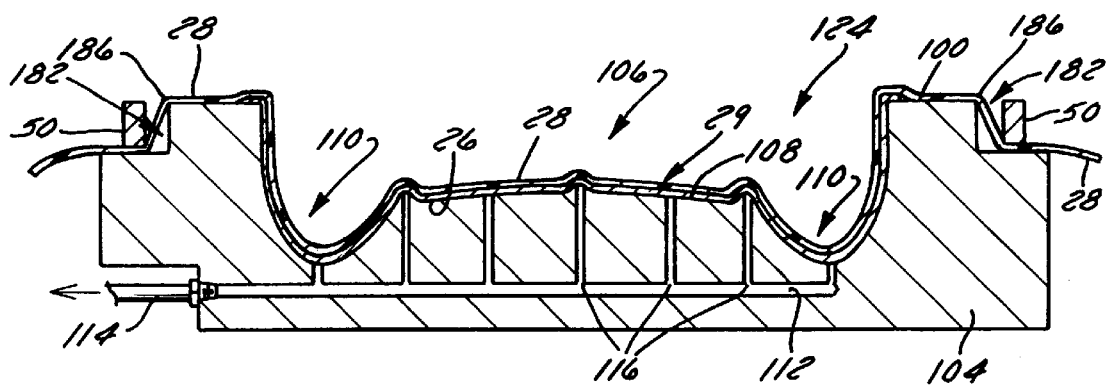
FIG. 12 is a cross sectional view of the mold and blank depicting the blank in contact with a three dimensionally contoured surface in the cavity of the mold.

Preferably, a vacuum of between about twenty-five and twenty-eight inches of mercury is created within the mold cavity 106 to relatively quickly draw the seat cover blank 29 tightly against the mold cavity surface 108, a s is illustrated in FIG. 12.

If desired, the fabric 26, film 28 and adhesive 52 can be sufficiently cooled upon forming and while the seat cover blank 29 is in the mold to fix the shape of the seat cover blank 29 so that the fabric 26 and film 28 retain the shape of the mold cavity surface 108, even if the seat cover blank 29 is thereafter removed from the mold 90. To enable the blank 29 to be removed from the mold after forming and before pouring the foam and molding, t he shape of the seat cover blank is preferably fixed by one of: (1) the bonding of the film 28 to the fabric 26, (2) the stretching of the film 28 during molding and bonding of it to the fabric 26, (3) the shape memory of the film 28 being set to the contours of the mold 94, (4) the shape memory of the fabric 26 being at least somewhat set to the contour s of the mold 94, and/or a combination of these aforementioned factors.

D. Molding

Figure 13:
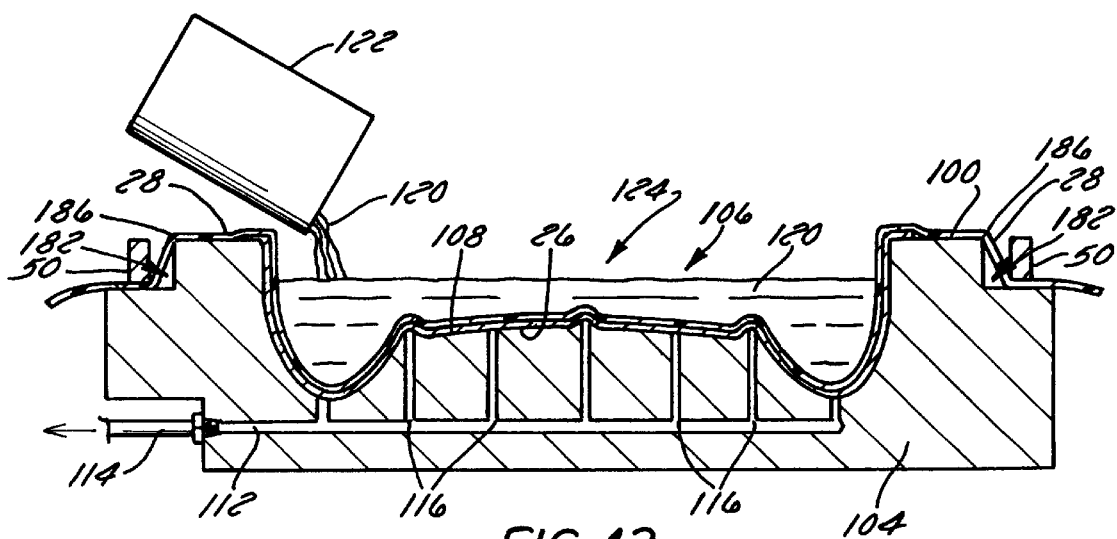
FIG. 13 is a cross sectional view of the mold and blank illustrating foam being poured into the mold cavity and over the blank.

After or upon forming the seat cover blank 29, a foam 120 is poured into the cavity 106 of the vacuum mold 94 over the blank 29 until the mold cavity 106 is at least partially filled with foam 120, as is shown in FIG. 13. After delivering the foam 120 into the mold cavity 106, such as by pouring it from a nozzle or bucket 122 or another delivery mechanism, the foam 120 is allowed to cure and harden. Preferably, when the foam 120 has sufficiently cured, the foam 120 and seat cover blank 29 form a seat cushion 24 having a foam core 30 that can be removed from the mold 90. After removal from the mold 90, the cushion 24 is trimmed to remove any excess blank material 29 from the seat cover portion of the cushion 24.

Preferably, the foam 120 is a polyurethane foam that is thermally settable so it cures and hardens as it cools to make a foam core 30 of desired density having desirable sag and good shock absorption characteristics. Preferably, the foam 120 is a liquid foam that is thermally activated so it expands to fill substantially the entire mold cavity 106. Alternatively, another urethane-based foam, a suitable heat settable pourable foam, or another suitable foam material that can be used in the construction of pour-in-place molded articles.

As is shown in FIG. 13, with the seat cover blank 29 against the mold cavity surface 108 of the vacuum mold 94, foam 120 is poured into the cavity 106 over the blank 29. Preferably, vacuum to the mold 94 is maintained during pouring of the foam 120 so t hat the seat cover blank 29 remains tightly drawn against the mold cavity surface 108 to ensure the production of a seat cushion 24 having good definition.

Figure 14:
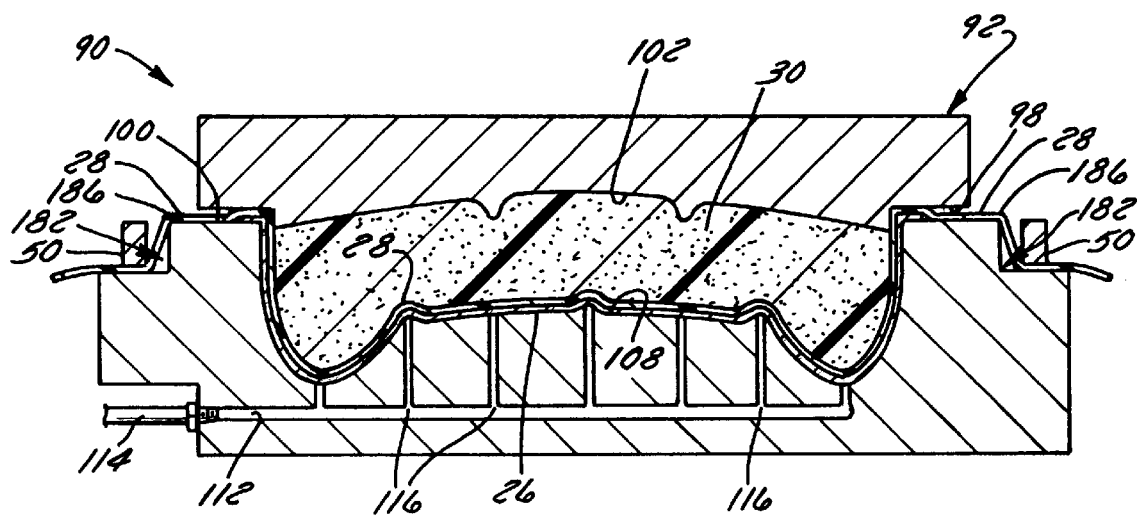
FIG. 14 is a cross sectional view of the vacuum mold, blank and an upper mold for forming the foam after it has expanded in the mold cavity of the vacuum mold.

Referring to FIG. 14, after a desired amount of foam 120 has been poured into the mold cavity 106 of the vacuum mold 94, the upper mold 92 is closed over the vacuum mold 94 with the face 98 of the upper mold 92 overlying and preferably bearing against the sealing surface 100 of the lower mold 94. As the foam expands, it preferably fills the mold cavity 106 of the lower mold 94 as well as the mold cavity 102 of the upper mold 92 imparting to the exposed portion of the foam core 30 (FIG. 15) that is not covered by fabric 26 a surface that is complementary to that of the upper mold cavity 102.

However, if the foam core surface contour and/or texture of the underside of the seat cushion 24 is not important, the foam 120 can be poured into the mold cavity 106 of the lower mold 94 and cured and hardened without requiring the upper mold 92. Moreover, if the upper mold 92 is not needed and the three dimensional contour of the seat cover blank 29 is suitably fixed after forming, the seat cover blank 29 can be completely removed from the vacuum mold 94 before the pouring the foam 120.

If it is desirable to produce a cushion 24 having different properties in different areas of the cushion, its foam core 30 can be constructed of foam having different densities to impart different properties to the cushion in different areas of the cushion. For example, it may be desirable to construct the cushion having an inner seat region 38 of a different firmness than the seat bolsters 36 of the cushion 24. Additionally, it may be desirable to have the inner seat region 38 of the cushion 24 possess different sag properties than the bolsters 36. Preferably, this can be accomplished by constructing a foam core 30 having foam sections of different densities. Methods of constructing such a foam core having different densities in different regions of the core is disclosed in U.S. Pat. Nos. 4,190,697 and 4,405,681, the disclosures of which are both hereby incorporated by reference.

Figure 15:
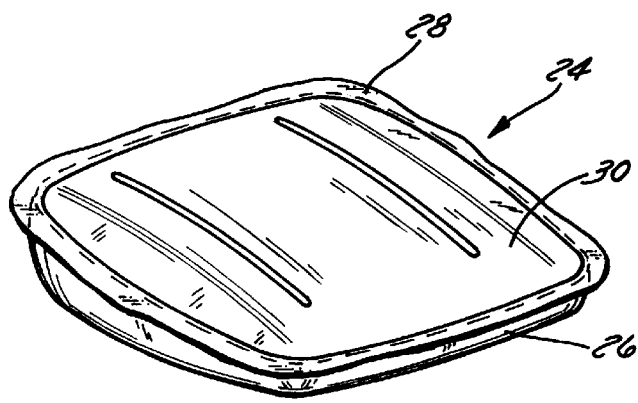
FIG. 15 is the seat cushion after molding is completed.
Figure 16:
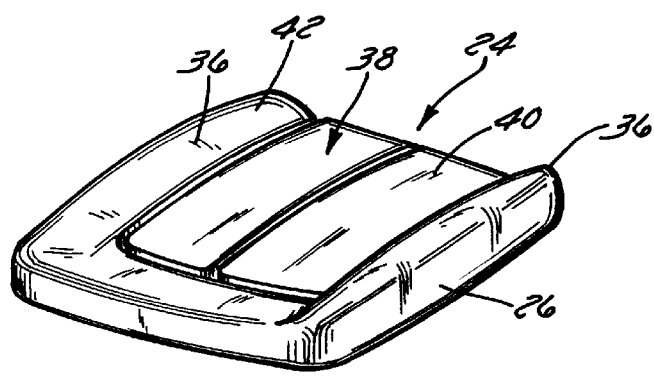
FIG. 16 is the seat cushion after trimming.

After molding is complete, a cushion 24 is formed. After the film of the seat cover blank 29 is removed from the frame 50, excess material extending outwardly from the cushion 24, such as is shown in FIG. 15, is trimmed. Preferably, due to the fabric 26 being cut to size before preforming, only a minimum of fabric 26 need be trimmed after molding is completed. As a result, preferably only film 28 must be trimmed and virtually no fabric must be trimmed to produce a seat cushion 24, such as is shown in FIG. 16, that can be assembled to form a vehicle seat, such as is depicted in FIG. 1.

V. Use and Operation

In use, the method of this invention is preferably used to make cushions for vehicle seats, such as for off-road vehicles like tractors and heavy equipment as well as for motorcycle, automobile and aircraft seats. Additionally, the method of this invention is well suited for use in making other types of cushions, such as cushions for office chairs, dental chairs, drafting stool cushions and cushions for other seating applications. Moreover, the method of this invention is also well suited for use in making other types of molded articles, such as for example, padded partitions, padding for headboards, paneling and wall coverings, as well as other types of articles that can have a foam core and fabric exterior.

In operation, as is shown in FIG. 3, a seat cover blank 29 is preferably constructed by securing a sheet of film 28 to the frame 50 and thereafter placing a piece of fabric 26 adjacent the film 28 and which preferably has a layer 66 of adhesive 52 preapplied to the side of the fabric 26 that is facing the film 28. Preferably, the fabric 26 is pre-cut to a desired size such that after molding it forms the exterior of the seat cushion 24 without requiring any fabric 26 to be trimmed.

After the seat cover blank 29 has been constructed and fixtured to the frame 50, the frame 50 is placed over the vacuum table 54 with the fabric 26 against the vacuum table top 58 and the film 28 overlying the fabric 26. Preferably, the fabric 26 is placed on the table 54 before the film 28 is placed on the table 54 over the fabric 26. To cause the film 28 to be drawn tightly against the fabric 26, a vacuum is applied. To cause the adhesive 52 to be preheated, the vacuum table 54 is placed in the oven 70. If desired, the vacuum can be applied before or after the vacuum table 54 has been placed in the oven 70.

After heating the seat cover blank 29 and applying a vacuum to draw and tack the fabric 26 against the film 28, the frame 50 and seat cover blank 29 are transferred to the female vacuum mold or cushion mold 94 where the frame 50, film 28 and fabric 26 are placed over the mold 94 with the fabric 26 closest to the mold cavity surface 108. The seat cover blank 29 is placed on the vacuum mold 94 while it is still at a high enough temperature such that the adhesive 52 has not permanently bonded the fabric 26 to the film 28 allowing relative movement between the fabric 26 and film 28 to occur during forming.

During forming, a vacuum is applied to the mold 94 causing the seat cover blank 29 to be drawn inwardly, stretching the heated film 28, until it is against the mold cavity surface 108, as is shown in FIGS. 11 & 12. If fabric tensioners 130 are used, each fabric tensioner 130 engages the fabric 26 for resisting migration of the fabric 26 into the mold cavity 106 by applying tension to the fabric 26 at least in the region it is engaging the fabric 26 thereby minimizing and preferably preventing buildup of undesirable compressive stresses in the fabric 26 in that region. As the seat cover blank 29 is drawn downwardly into the mold cavity 106, the still hot adhesive 52 preferably permits the fabric 26 to slide relative to the film 28 thereby permitting the film 28 to (a) function as a seal about the periphery of the mold 94 to ensure good vacuum is maintained and (b) to stretch as it is being drawn into the mold cavity 106 providing support to the fabric 26, thereby (c) minimizing the amount that the fabric 26 must stretch. Also to minimize fabric stretch, the fabric 26 is not secured to the frame 50 during forming. By not securing the fabric 26 to the frame 50, wrinkling of the fabric 26 during forming is minimized and preferably prevented.

During molding, as is depicted in FIGS. 13 & 14, foam 120 is poured into a recess 124 in the seat cover blank 29 caused where the blank 29 has been drawn downwardly into the mold cavity 106 against the contours of the mold cavity surface 108. After pouring the foam 120 and preferably after the foam 120 has cured and hardened, the film 28 is released from the frame 50 and excess seat cover blank material about the periphery of the cushion 24, such as is illustrated in FIG. 15, is trimmed to form a seat cushion 24 of preferably substantially unitary construction, as is depicted in FIG. 16.

It is also to be understood that, although the foregoing description and drawings describe and illustrate in detail a working embodiment of the present invention, to those skilled in the art to which the present invention relates, the present disclosure will suggest many modifications and constructions as well as widely differing embodiments and applications without thereby departing from the spirit and scope of the invention. The present invention, therefore, is intended to be limited only by the scope of the appended claims and the applicable prior art.

What is claimed is:

1. A method of making a seat cushion comprising:
   (a) providing a film constructed of a stretchable material, a frame in which the film is secured, a seat cover fabric, an adhesive, a mold having a cavity with a contoured seat cushion-forming surface, and a foamable material for making a support core for supporting the shape of the seat cover fabric after its shape has been fixed,
   (b) securing the film to the frame,
   (c) placing the seat cover fabric on the film with the adhesive between the seat cover fabric and film and without securing the seat cover fabric to the frame,
   (d) orienting the seat cover fabric, adhesive, and film on a surface such that the fabric is disposed closest to the surface and the film is disposed over the fabric,
   (e) tacking the seat cover fabric to the film using a vacuum that urges the film toward the surface and against the fabric,
   (f) forming the seat cover fabric and film by drawing the seat cover fabric and film into the cavity of the mold such that the seat cover fabric is three-dimensionally contoured,
   (g) fixing the shape of the seat cover fabric so that it substantially conforms to the seat cushion-forming contoured surface of the mold cavity, and
   (h) supporting the shape of the seat cover fabric by disposing the support core, that comprises the foamable material formed in situ, in the recess in the seat cover fabric to form a seat cushion.

2. The method of making a seat cushion of claim 1 wherein the support core is comprised of foam.

3. The method of making a seat cushion of claim 1 wherein before or during step (e) the step further comprising heating the adhesive.

4. The method of making a seat cushion of claim 3 wherein the fluid is heated until it becomes a fluid and during step (e) the fabric and film are drawn together while the adhesive is fluid.

5. The method of making a seat cushion of claim 4 wherein the surface comprises a vacuum table in communication with a vacuum source.

6. The method of making a seat cushion of claim 3 wherein during heating of the adhesive the adhesive is heated to a temperature that renders the adhesive a fluid permitting the seat cover fabric to move relative to the film.

7. The method of making a seat cushion of claim 6 wherein the adhesive has an activation temperature above which it becomes a fluid and during heating of the adhesive the adhesive is heated to a temperature above its activation temperature to permit the seat cover fabric to move relative to the film during step (f).

8. The method of making a seat cushion of claim 7 wherein during heating of the adhesive the adhesive is heated to a temperature of at least about two hundred degrees Fahrenheit.

9. The method of making a seat cushion of claim 8 wherein during step (f) the fabric and film are drawn together.

10. The method of making a seat cushion of claim 9 wherein the surface comprises a vacuum table in communication with a vacuum source.

11. The method of making a seat cushion of claim 10 wherein the mold is a vacuum mold in communication with a vacuum source and during step (f) the seat cover fabric and film are placed in the mold with the seat cover fabric disposed closest to the mold cavity and the film overlying the seat cover fabric and thereafter applying a vacuum to draw the seat cover fabric into the cavity of the mold.

12. The method of making a seat cushion of claim 11 wherein the fabric moves relative to the film during step (f).

13. The method of making a seat cushion of claim 12 wherein the seat cover fabric is a fabric capable of stretching no greater than one hundred percent.

14. The method of making a seat cushion of claim 13 wherein the seat cover fabric is a low stretch fabric that is capable of stretching no greater than fifty percent.

15. The method of making a seat cushion of claim 12 comprising during step (f) the further step of applying tension to a portion of the seat cover fabric in a direction generally opposing the seat cover fabric being drawn into the cavity of the mold.

16. The method of making a seat cushion of claim 12 further comprising providing a hook carried by the frame biased to apply a tension to a portion of the seat cover fabric and during step (f) engaging the hook to a portion of the seat cover fabric and opposing movement of the seat cover fabric into the cavity of the mold.

17. The method of making a seat cushion of claim 16 comprising providing a generally U-shaped spring operably connected to the hook and the frame that biases the hook so that it can move relative to the frame to apply a tension to a portion of the seat cover fabric.

18. The method of making a seat cushion of claim 12 wherein during step (g) the adhesive bonds the seat cover fabric to the film.

19. The method of making a seat cushion of claim 18 wherein the temperature of the adhesive is lowered to cause the adhesive to bond the seat cover fabric to the film during step (g).

20. The method of making a seat cushion of claim 19 wherein the temperature of the adhesive is lowered to a temperature that is below its activation temperature.

21. The method of making a seat cushion of claim 18 wherein the support core is comprised of a thermally activated liquid foam and during step (h) thermally activated liquid foam is poured into a recess formed in the seat cover fabric and allowed to harden during or after step (g).

22. The method of making a seat cushion of claim 21 wherein after step (g) the seat cover fabric and film are removed from the mold before step (h).

23. The method of making a seat cushion of claim 5 wherein the seat cover fabric is disposed against the vacuum table and the vacuum table has a roughened surface that grips the seat cover fabric when the vacuum is applied in step (e) to resist shrinkage of the seat cover fabric when the adhesive is heated.

24. The method of making a seat cushion of claim 5 wherein the vacuum table is separate from the mold and the seat cover fabric, adhesive and film are transferred from the vacuum table to the mold before step (f).

25. The method of making a seat cushion of claim 5 wherein a portion of the film extends outwardly beyond the periphery of the seat cover fabric so that the portion of the film seals directly against the vacuum table during step (e).

26. The method of making a seat cushion of claim 25 wherein the adhesive is heated to a temperature of at least 280° Fahrenheit while a vacuum of at least about 5 inches of mercury is applied by the vacuum table to urge the film toward the vacuum table and against the fabric.

27. The method of making a seat cushion of claim 1 wherein the surface and the mold are separate components, and the seat cover fabric, adhesive and film are transferred from the surface to the mold after step (e) and before step (f).

28. The method of making a seat cushion of claim 1 wherein the seat cover fabric is comprised of at least two pieces of fabric that are each capable of stretching no more than 50%.

29. The method of making a seat cushion of claim 28 wherein each piece of fabric of the seat cover fabric is not joined at or about its periphery to any other piece of fabric.

30. The method of making a seat cushion of claim 1 wherein the seat cover fabric comprises a low stretch fabric that is capable of stretching no more than 50% and the film comprises a polymeric film that is capable of stretching at least 150%.

31. The method of making a seat cushion of claim 30 wherein the film is heated to or above a temperature at which the shape memory of the film is reset.

32. The method of making a seat cushion of claim 31 wherein the film and the adhesive are heated at the same time and before step (g).

33. The method of making a seat cushion of claim 32 wherein the film comprises a urethane film and the adhesive comprises a heat activated polyamide adhesive and during heating the film and the adhesive are heated to a temperature of at least 200° Fahrenheit.

34. The method of making a seat cushion of claim 30 wherein the film is heated to a temperature of at least 100° Fahrenheit before forming takes place in step (f).

35. The method of making a seat cushion of claim 34 wherein the film is heated to a temperature of between about 230° Fahrenheit and about 250° Fahrenheit.

36. The method of making a seat cushion of claim 1 wherein the adhesive is in a fluid state during step (f) permitting the seat cover fabric to move relative to the film during forming.

37. A method of making a seat cushion comprising:
(a) providing a film comprised of a polymeric or plastic material that is capable of being stretched at least 150%, a frame in which the film is attached, a seat cover fabric comprised of a fabric that is capable of stretching no more than 100%, an adhesive, a mold having a cavity with a contoured seat cushion-forming surface, and a foamable liquid for forming a compressible foam support core for supporting the shape of the seat cover fabric,
(b) attaching the film to the frame,
(c) placing the seat cover fabric on the film with the adhesive between the seat cover fabric and film and without securing the seat cover fabric to the frame,
(d) positioning the seat cover fabric, adhesive, and film on a surface such that the fabric is disposed closest to the surface and the film is disposed over the fabric,
(e) heating the seat cover fabric, adhesive, and film to a temperature of at least 200° Fahrenheit such that the adhesive becomes a fluid,
(f) tacking the seat cover fabric to the film by applying a vacuum that urges the film against the fabric,
(g) forming the seat cover fabric and film by applying a vacuum that draws the seat cover fabric and film into the cavity of the mold such that the seat cover fabric is three-dimensionally contoured,
(h) fixing the shape of the seat cover fabric such that its shape substantially conforms to the three-dimensionally contoured shape of the mold cavity by cooling or allowing to cool the seat cover fabric, adhesive and film so that 1) the shape memory of the film is set such that its shape substantially conforms to the shape of the mold cavity, and the 2) adhesive bonds the fabric to the film, and
(i) supporting the shape of the seat cover fabric by disposing the compressible foam support core in a recess in the seat cover fabric and film to form a seat cushion, wherein the compressible foam support core is comprised of the foamable material that is formed in situ.

38. The method of making a seat cushion of claim 37 wherein the compressible foam support core is comprised of a foamable liquid that is poured into the recess in the seat cover fabric and film during step (i) and thereafter allowing the foamable liquid to foam and harden.

39. The method of making a seat cushion of claim 38 wherein during step (g) tension is selectively applied to the seat cover fabric that opposes drawing the fabric into the mold cavity.

40. The method of making a seat cushion of claim 39 wherein the seat cover fabric is comprised of a low stretch fabric that is capable of stretching no more than 50%.

41. A method of making a seat cushion comprising:
(a) providing a film comprised of a polymeric or plastic material that is capable of being stretched at least 150%, a frame in which the film is secured, a seat cover fabric comprised of a low stretch fabric that is capable of stretching no more than 50%, an adhesive, a mold having a cavity with a contoured seat cushion-forming surface, and a liquid foaming material,
(b) attaching the film to the frame,
(c) placing the seat cover fabric on the film with the adhesive between the seat cover fabric and film and without securing the seat cover fabric to the frame,
(d) positioning the seat cover fabric, adhesive, and film on a surface such that the fabric is disposed closest to the surface and the film is disposed over the fabric,
(e) heating the seat cover fabric, adhesive, and film to a temperature of at least 200° Fahrenheit such that the adhesive becomes a fluid,
(f) applying a vacuum to urge the film toward the surface and against the fabric while the adhesive is a fluid to cause the fabric to adhere to the film,
(g) forming the seat cover fabric and film by applying a vacuum to draw the seat cover fabric and film into the cavity of the mold while the adhesive is a fluid such that the seat cover fabric is three-dimensionally contoured and the film is stretched more than the seat cover fabric,
(h) fixing the shape of the seat cover fabric such that its shape substantially conforms to the three-dimensionally contoured shape of the mold cavity by cooling or allowing to cool the seat cover fabric, adhesive and film so that 1) the shape memory of the film is set such that its shape substantially conforms to the shape of the mold cavity, and the 2) adhesive sets and bonds the fabric to the film, and
(i) supporting the shape of the seat cover fabric by pouring the liquid foaming material into a recess in the seat cover fabric and film and allowing the liquid foaming material to foam and harden.

42. The method of making a seat cushion of claim 41 wherein the adhesive sets by hardening into a solid.

* * * * *